(12) United States Patent
Nakanishi et al.

(10) Patent No.: US 12,458,239 B2
(45) Date of Patent: Nov. 4, 2025

(54) MEASUREMENT DEVICE, INFORMATION TERMINAL, NON-TRANSITORY RECORDING MEDIUM INCLUDING CONTROL PROGRAM RECORDED THEREON, AND MEASUREMENT SYSTEM

(71) Applicant: OMRON HEALTHCARE Co., Ltd., Kyoto (JP)

(72) Inventors: Motofumi Nakanishi, Kyoto (JP); Daisuke Ishihara, Kyoto (JP); Miki Okugawa, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 792 days.

(21) Appl. No.: 17/660,567

(22) Filed: Apr. 25, 2022

(65) Prior Publication Data

US 2022/0240794 A1    Aug. 4, 2022

Related U.S. Application Data

(63) Continuation of application No. PCT/JP2020/036915, filed on Sep. 29, 2020.

(30) Foreign Application Priority Data

Oct. 30, 2019   (JP) .................................. 2019-197876

(51) Int. Cl.
*A61B 5/0225*    (2006.01)
*A61B 5/00*    (2006.01)

(52) U.S. Cl.
CPC .......... *A61B 5/0225* (2013.01); *A61B 5/0002* (2013.01); *A61B 5/6801* (2013.01)

(58) Field of Classification Search
CPC .... A61B 5/0225; A61B 5/0002; A61B 5/6801
(Continued)

(56) References Cited

U.S. PATENT DOCUMENTS

2008/0027679 A1\* 1/2008 Shklarski ............... A61B 5/681
702/182
2014/0194700 A1 7/2014 Ikeya et al.
2016/0327984 A1 11/2016 Al-Ali et al.

FOREIGN PATENT DOCUMENTS

CN   103908230 A   7/2014
JP   2004-5341 A   1/2004
(Continued)

OTHER PUBLICATIONS

Office Action for CN Patent Publication No. 202080070206.5 issued Feb. 6, 2024.
(Continued)

*Primary Examiner* — Alex M Valvis
*Assistant Examiner* — Chanel J Jhin
(74) *Attorney, Agent, or Firm* — Colson Law Group, PLLC

(57) ABSTRACT

Provided is a technology that enables information display to be easily understandable to a user. A measurement device according to an aspect of the present invention includes a measurement unit configured to perform measurement of biological information, a first display unit configured to display a result of the measurement performed by the measurement unit, an installation unit configured to install an information terminal on the installation unit, the information terminal including a second display unit configured to display the result of the measurement, a communication unit configured to directly communicate with the information terminal installed on the installation unit, and a control unit configured to, while the information terminal is installed on the installation unit, cause the result of the measurement to be transmitted from the communication unit to the information terminal to cause the second display unit to display the result of the measurement.

12 Claims, 17 Drawing Sheets

(58) Field of Classification Search
USPC .......................................................... 600/485
See application file for complete search history.

(56) References Cited

FOREIGN PATENT DOCUMENTS

| | | |
|---|---|---|
| JP | 2007-151941 A | 6/2007 |
| JP | 2014-000147 A | 1/2014 |
| JP | 2014-132931 A | 7/2014 |
| JP | 2014-188063 A | 10/2014 |
| JP | 2014-533997 A | 12/2014 |
| JP | 2016-187439 A | 11/2016 |
| JP | 2019-017865 A | 2/2019 |

OTHER PUBLICATIONS

International Preliminary Report on Patentability for International Application No. PCT/JP2020/036915, dated May 11, 2021.
International Search Report (ISR) for Application No. PCT/JP2020/036915, dated Dec. 22, 2020.
International Preliminary Report (IPRP) for Application No. PCT/JP2020/036915, dated May 11, 2021.

* cited by examiner

[FIG. 1]
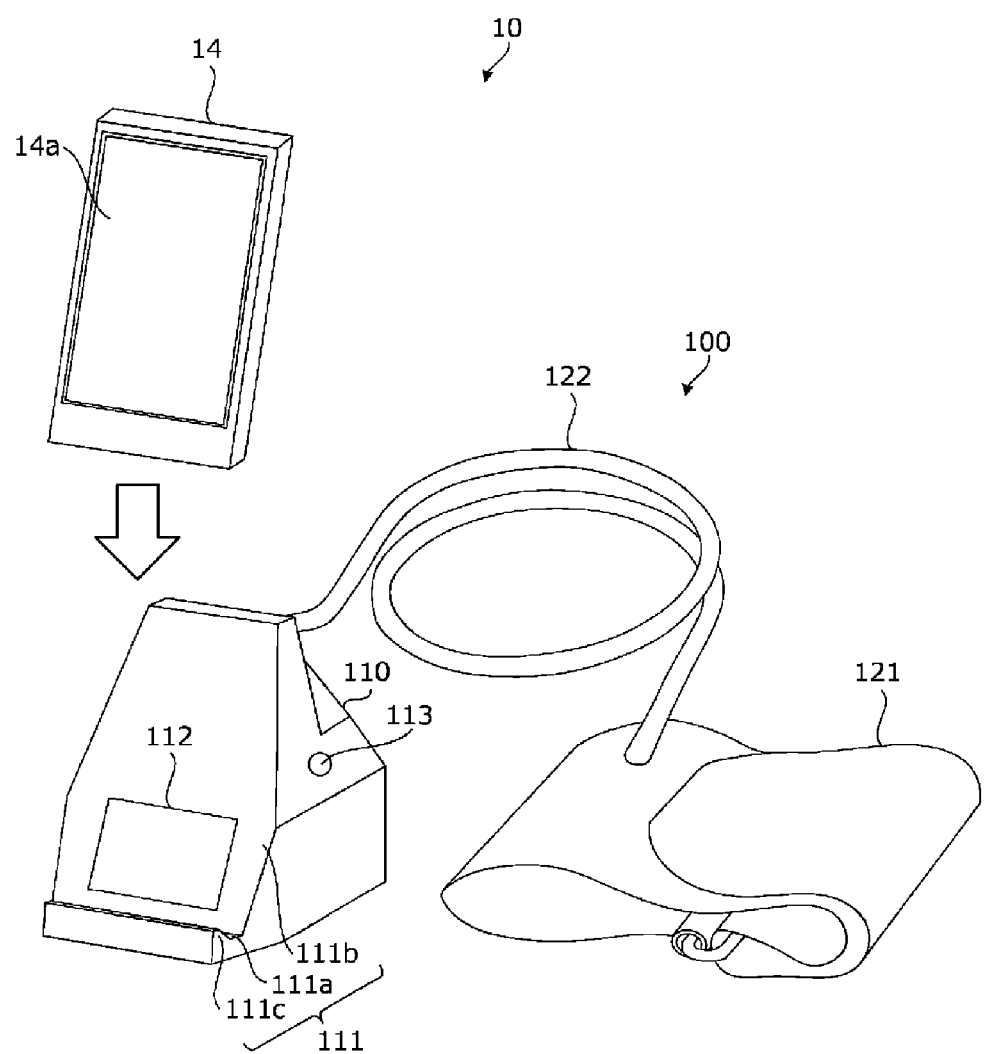

[FIG. 2]
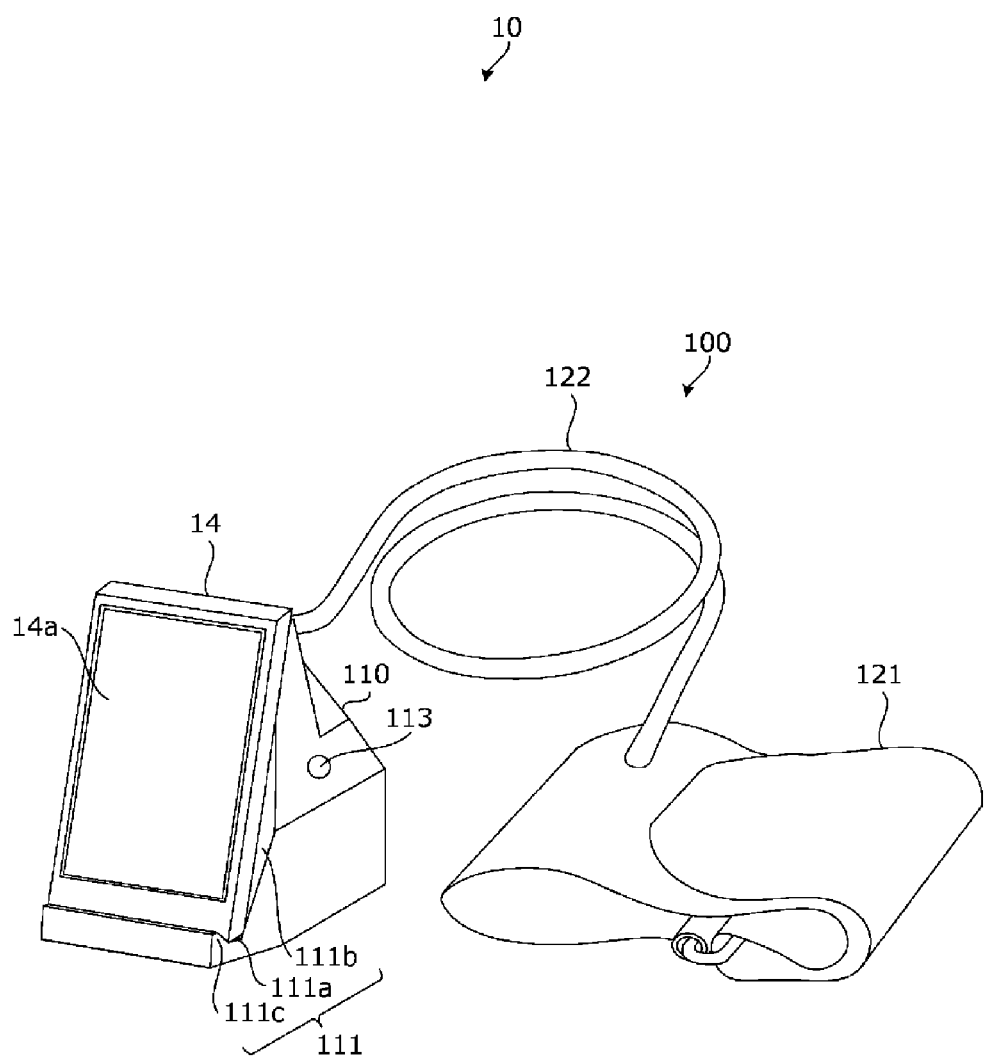

[FIG. 3]
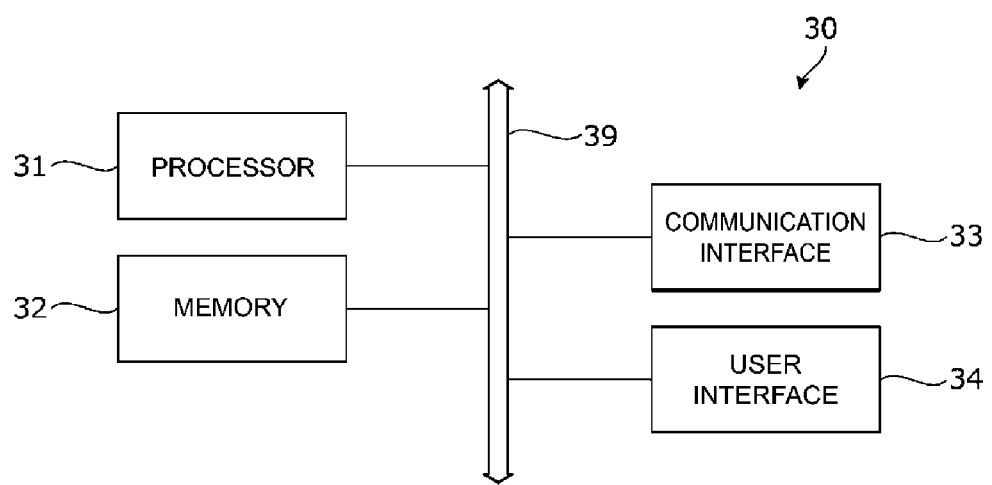

[FIG. 4]
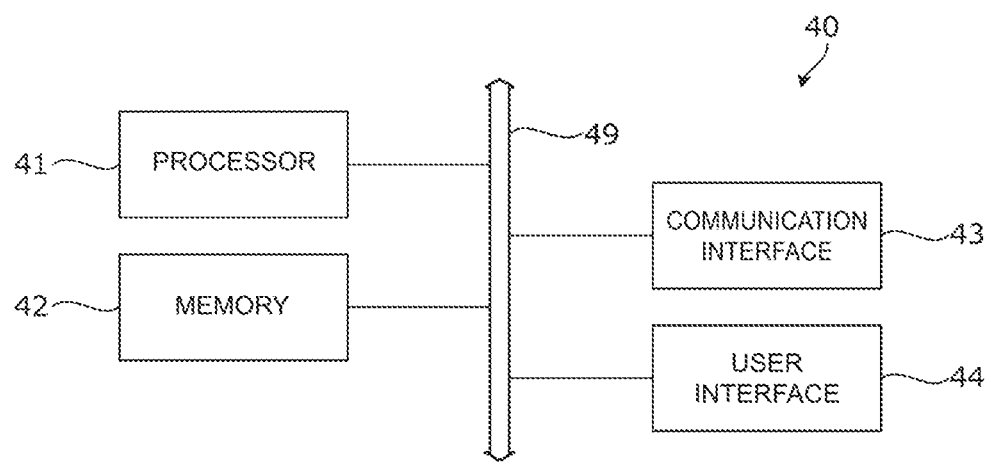

[FIG. 5]
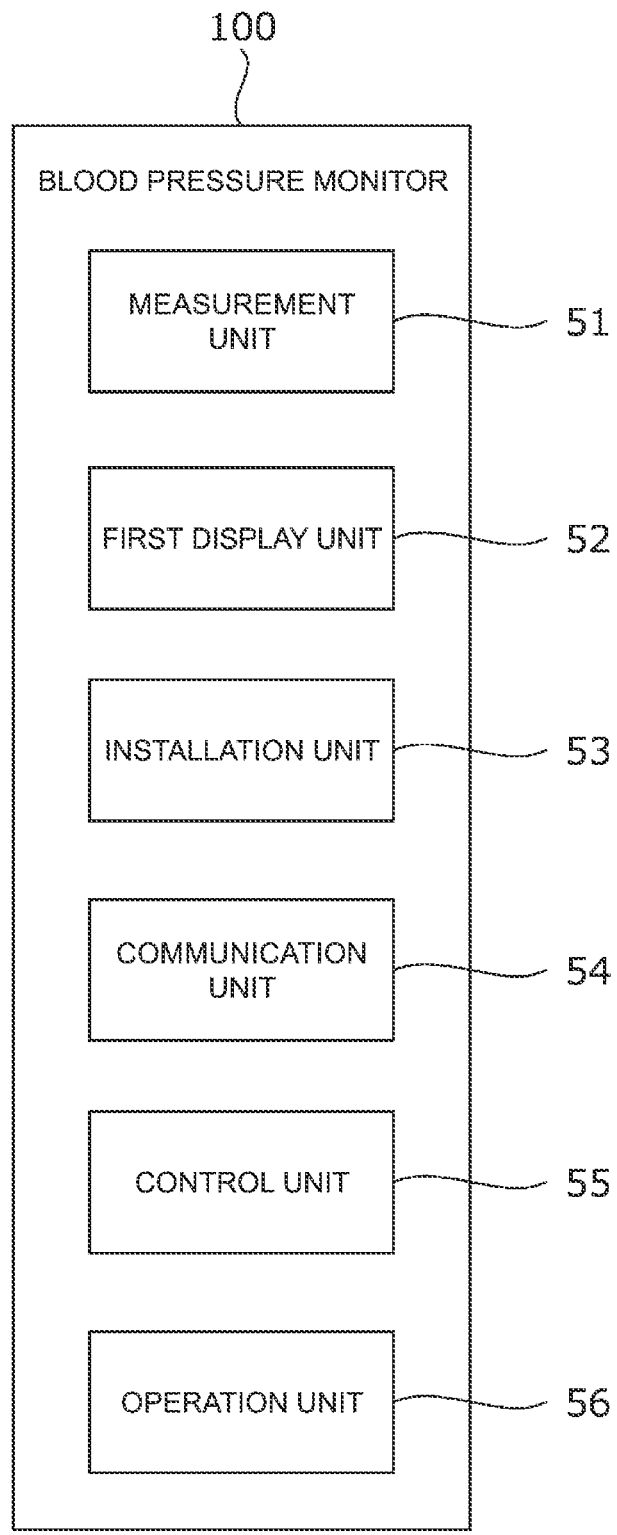

[FIG. 6]
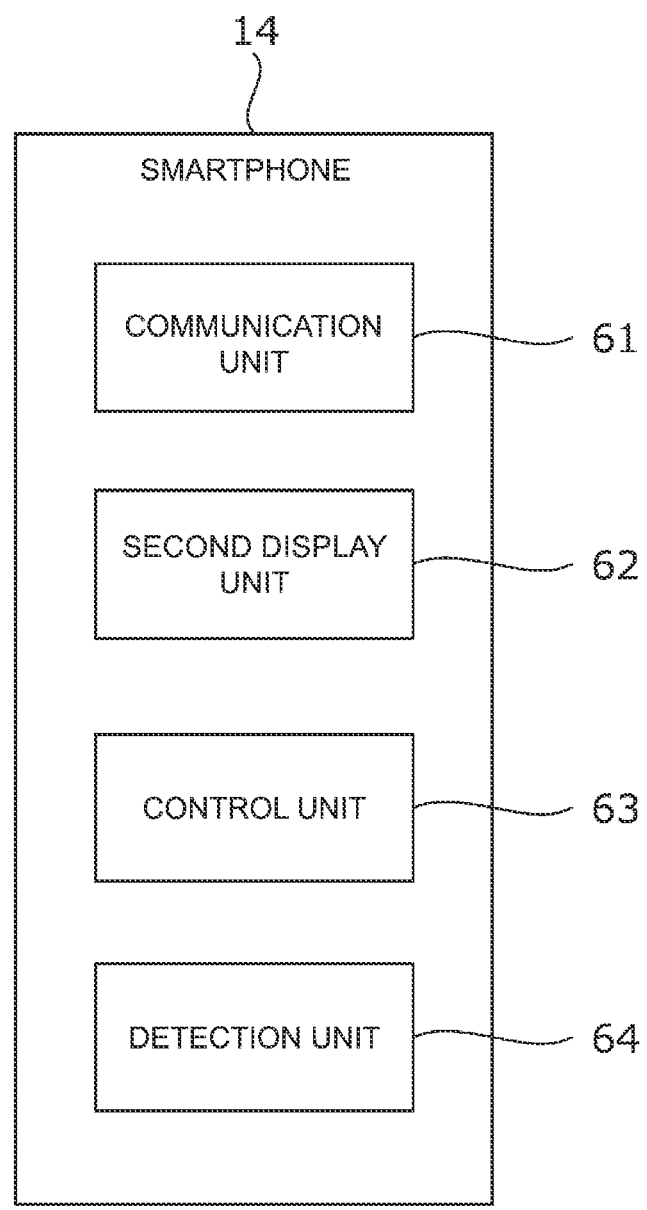

[FIG. 7]
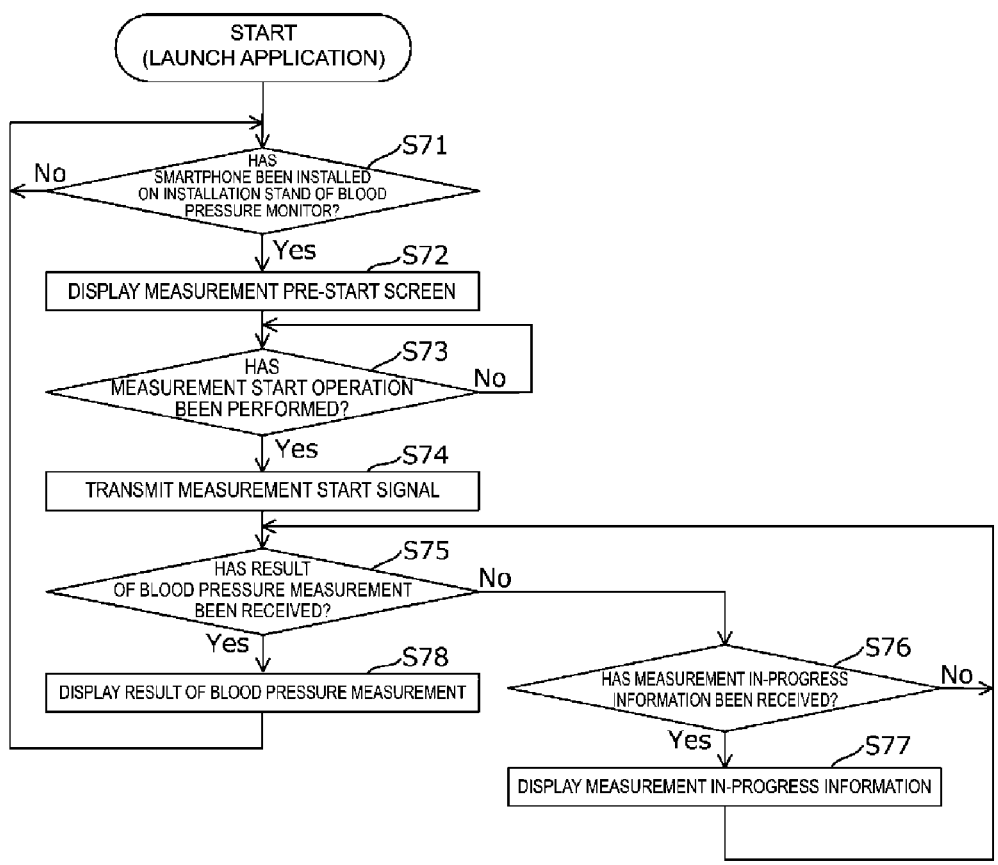

[FIG. 8]
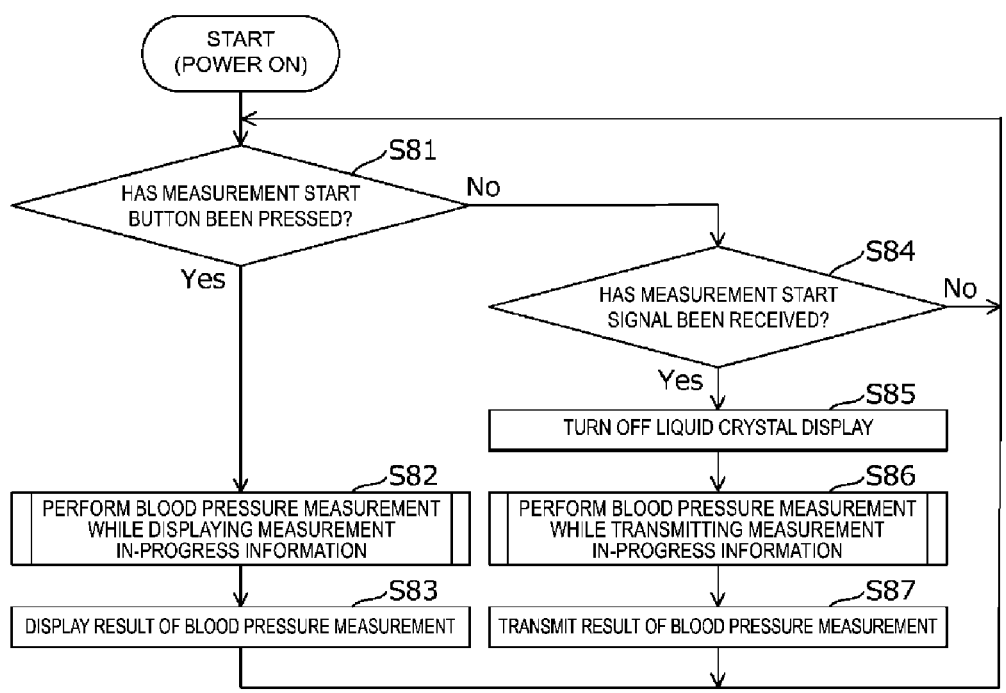

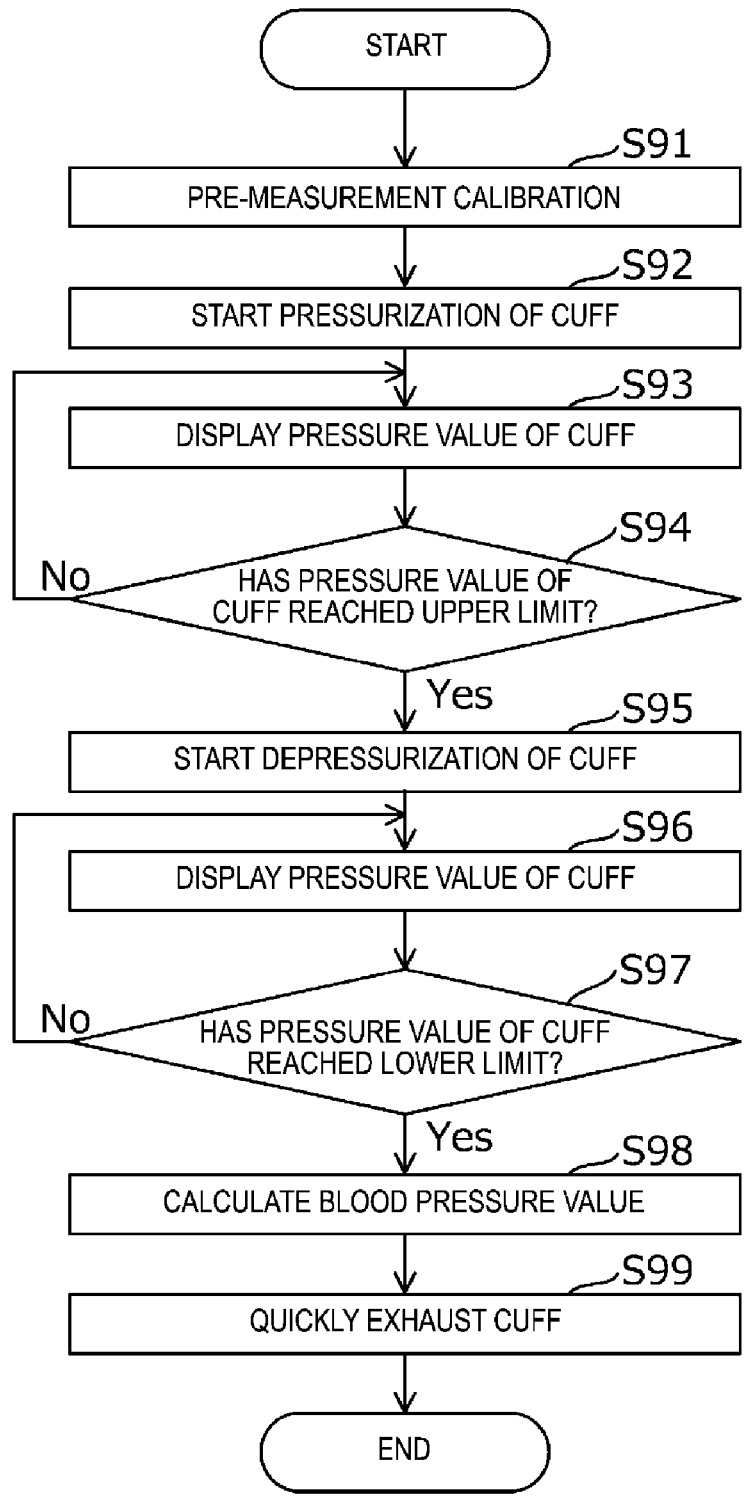
[FIG. 9]

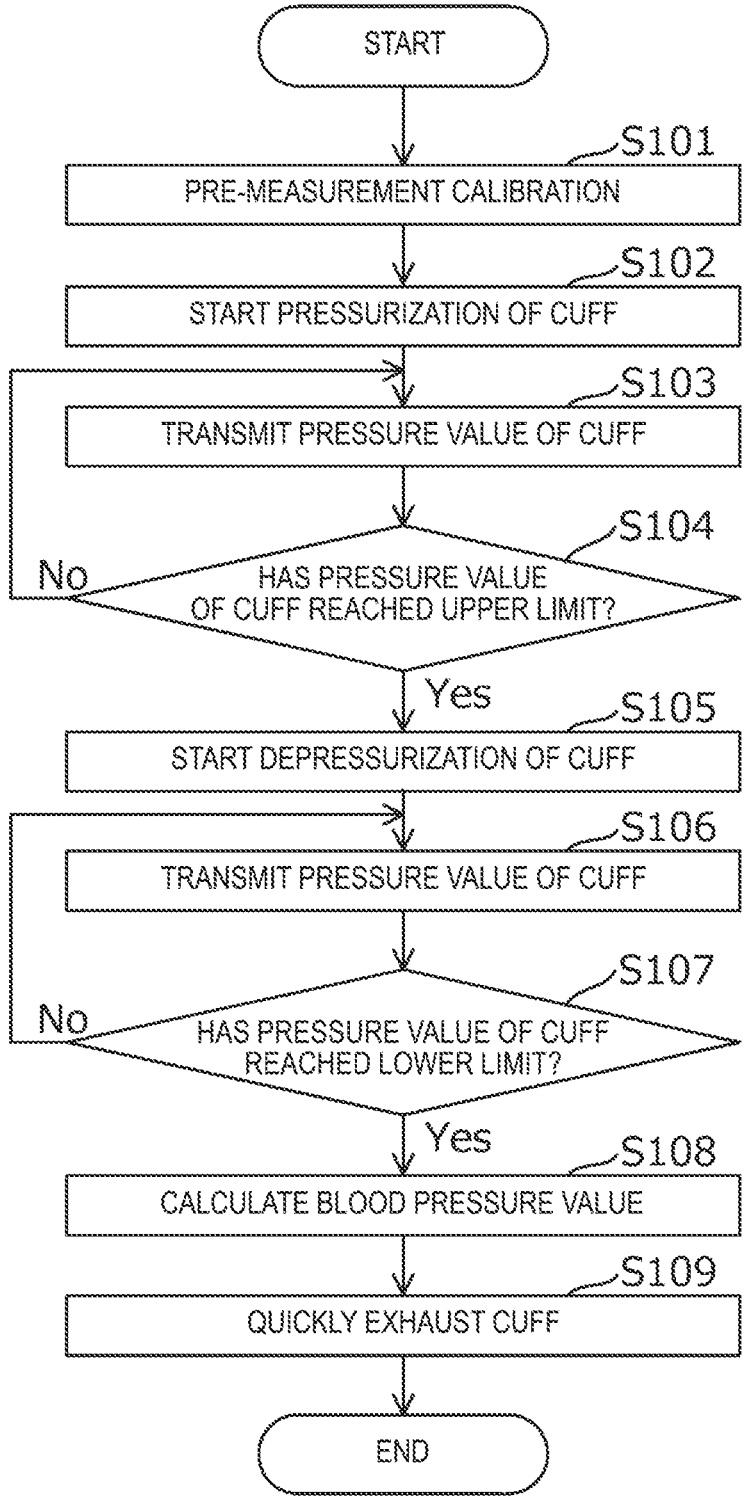
[FIG. 10]

[FIG. 11]
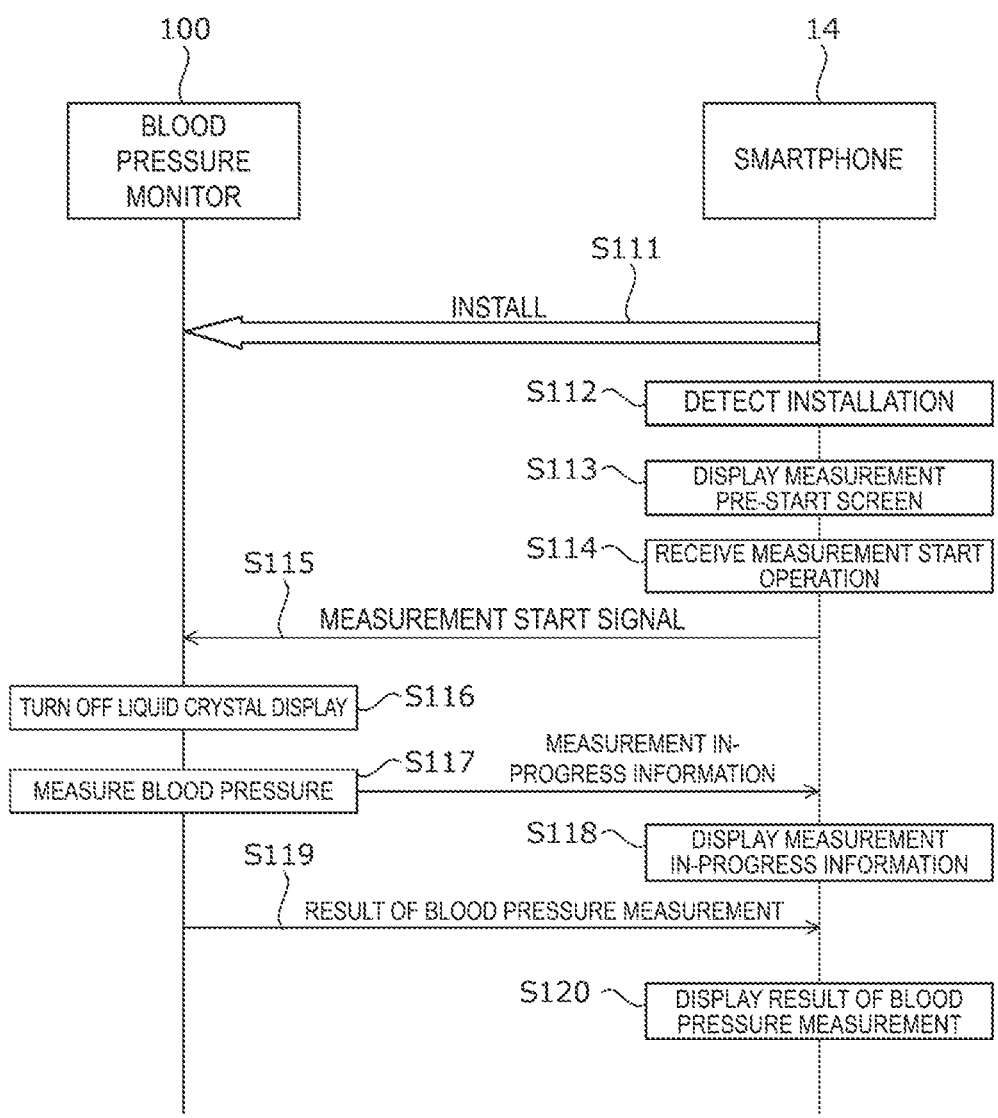

[FIG. 12]
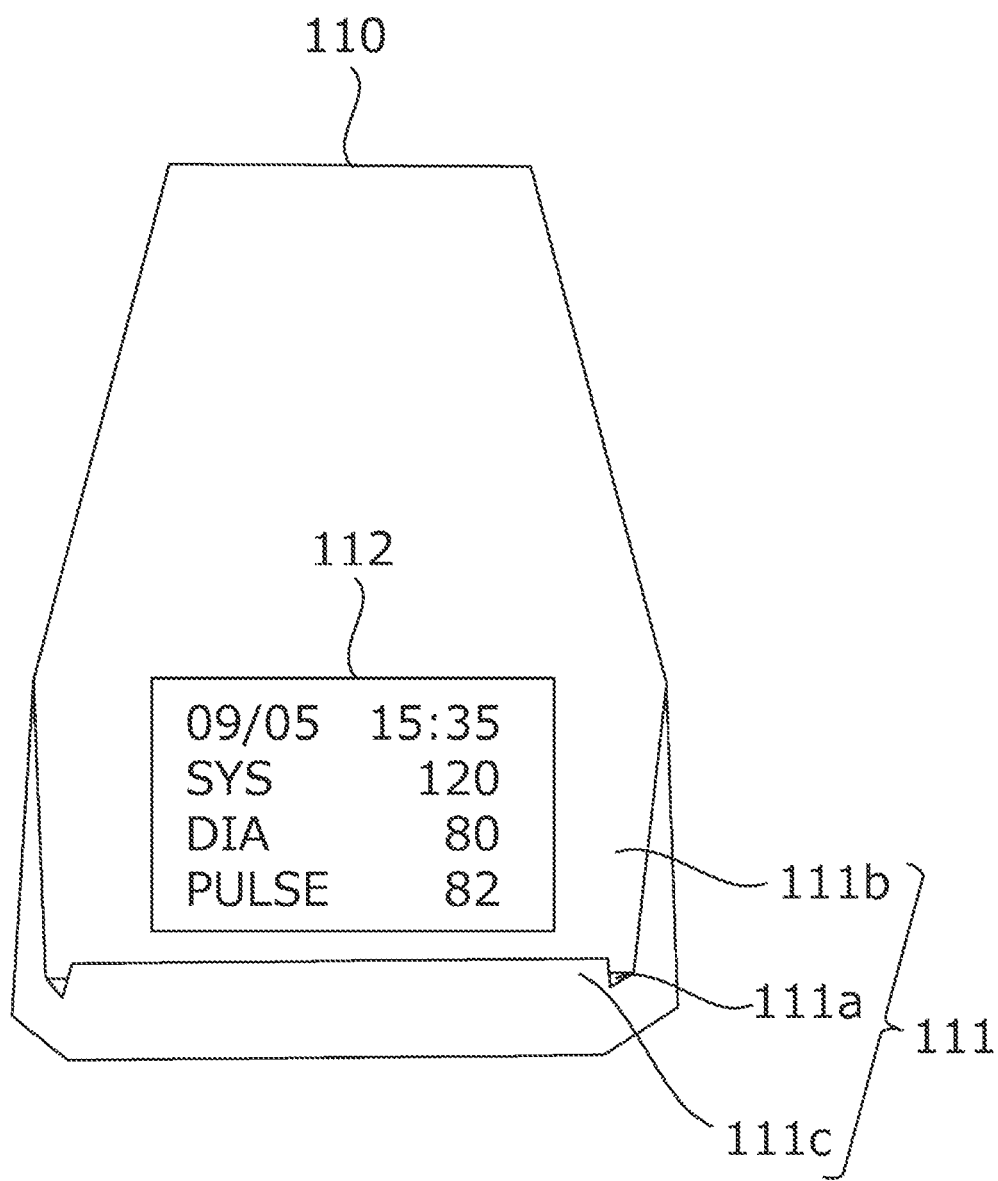

[FIG. 13]
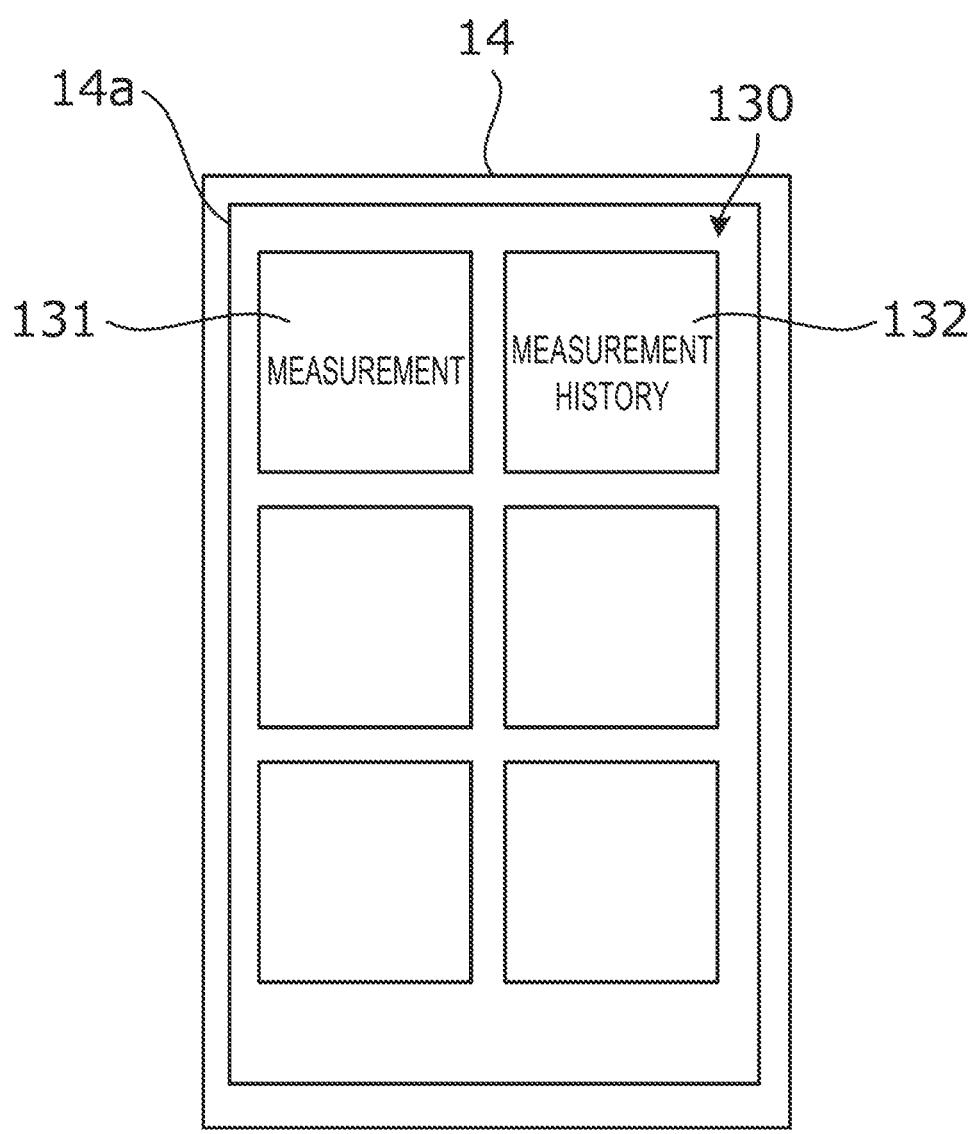

[FIG. 14]
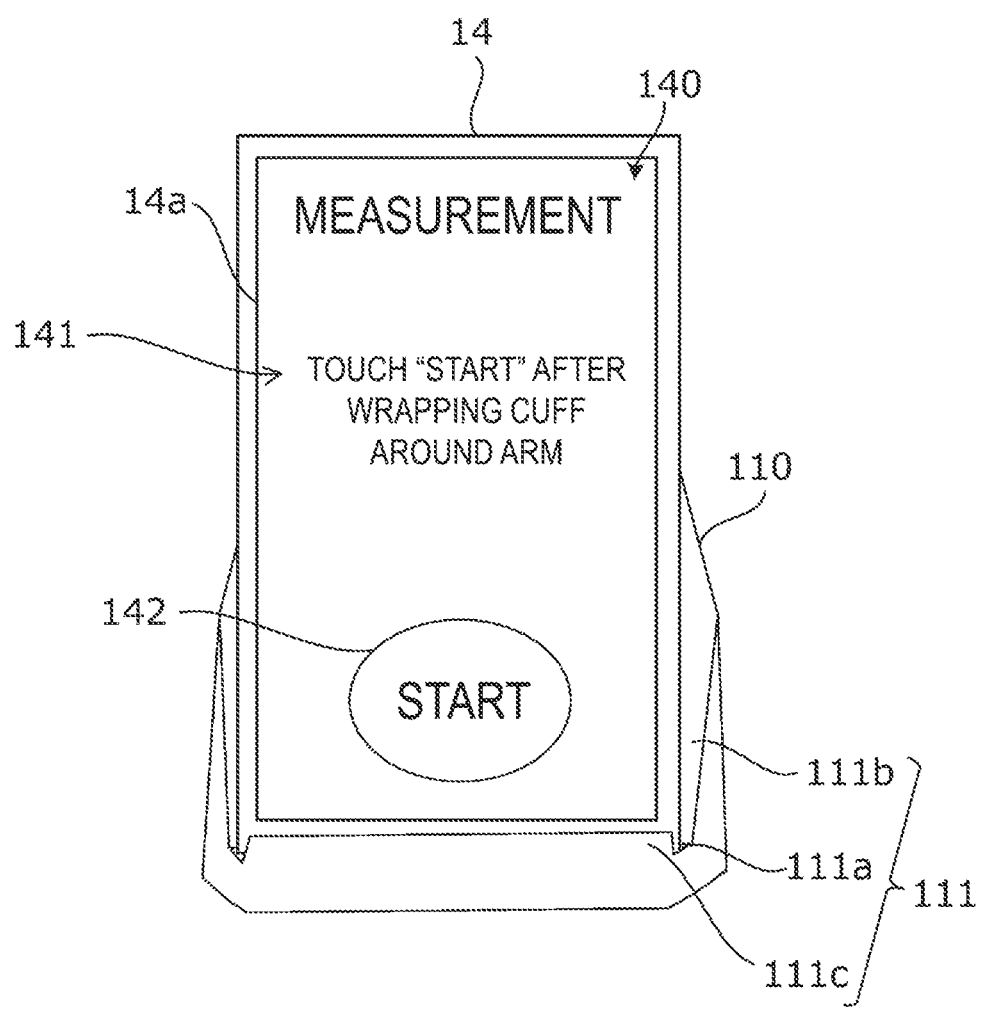

[FIG. 15]
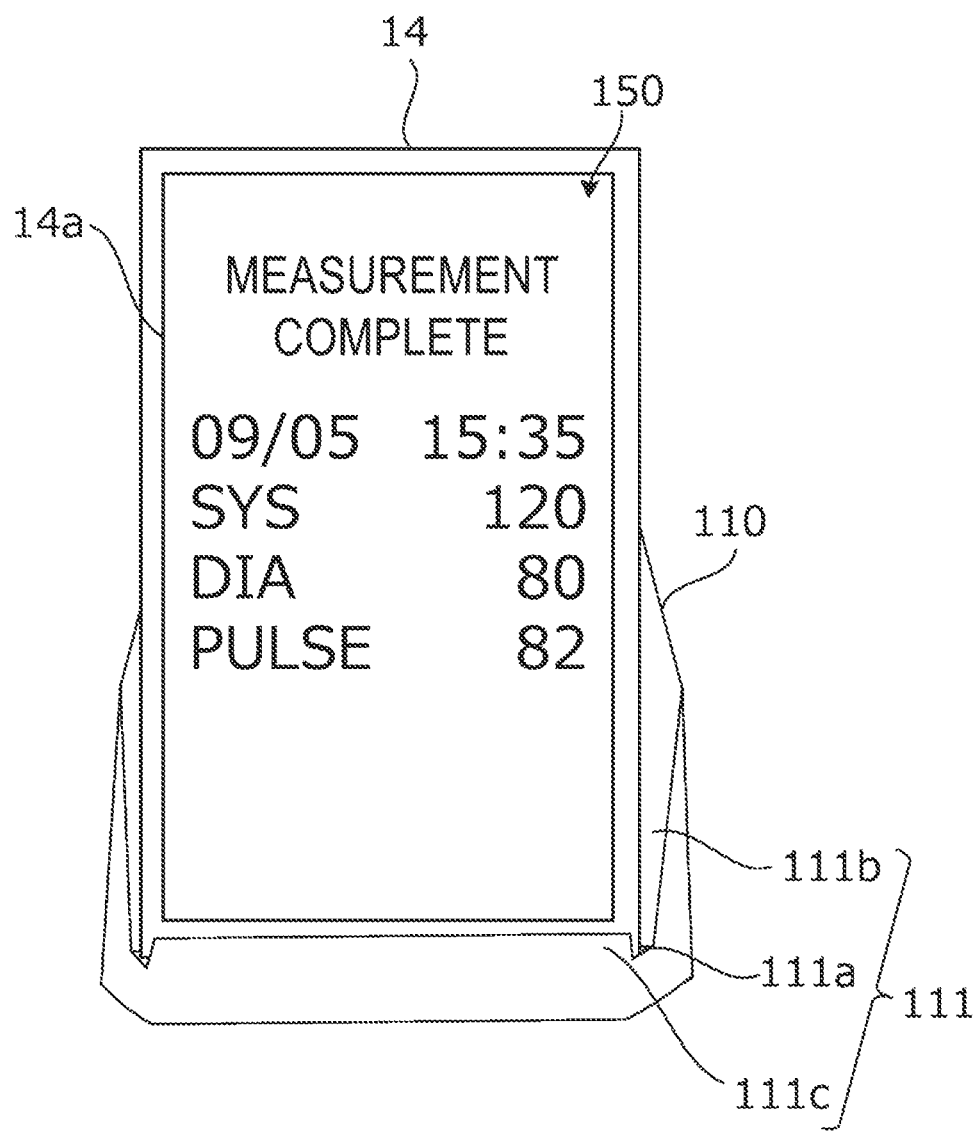

[FIG. 16]
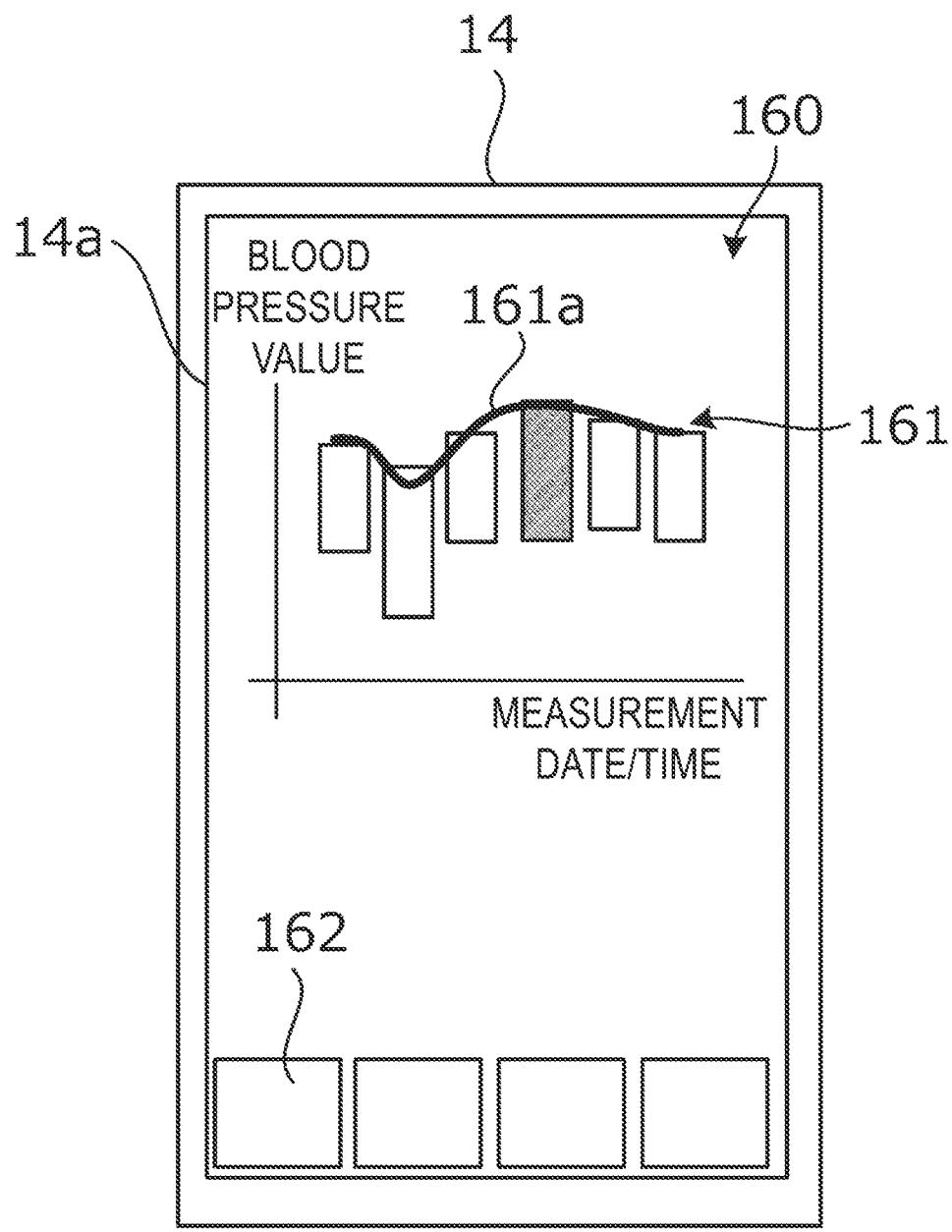

[FIG. 17]
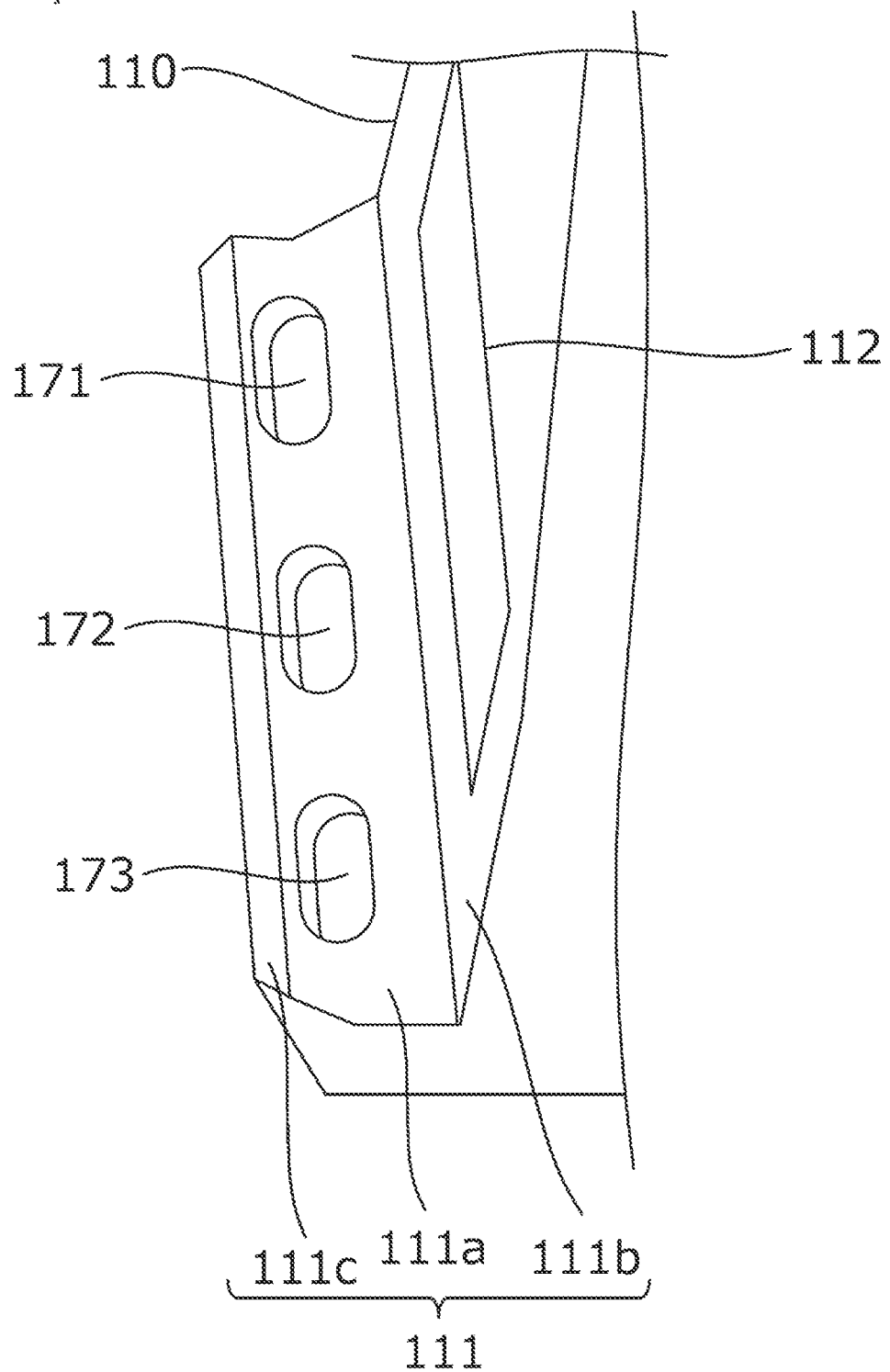

MEASUREMENT DEVICE, INFORMATION TERMINAL, NON-TRANSITORY RECORDING MEDIUM INCLUDING CONTROL PROGRAM RECORDED THEREON, AND MEASUREMENT SYSTEM

CROSS-REFERENCE TO RELATED APPLICATIONS

This application is the U.S. national stage application filed pursuant to 35 U.S.C. 365(c) and 120 as a continuation of International Patent Application No. PCT/JP2020/036915, filed Sep. 29, 2020, which application claims priority to Japanese Patent Application No. 2019-197876, filed Oct. 30, 2019, which applications are incorporated herein by reference in their entireties.

TECHNICAL FIELD

The present invention relates to a measurement device, an information terminal, a non-transitory recording medium including a control program recorded thereon, and a measurement system.

BACKGROUND ART

In the related art, a configuration is known in which a portable wireless communication terminal can be disposed on a blood pressure monitor in order to ensure wireless communication between the portable wireless terminal and the blood pressure monitor (Patent Document 1). Additionally, a configuration is known in which a mobile terminal wirelessly connected to a blood pressure monitor is used to display information related to blood pressure measurement (Patent Document 2). In addition, a blood pressure monitor is known that performs blood pressure measurement using a display device of a portable device as a display unit (Patent Document 3).

CITATION LIST

Patent Literature

Patent Document 1: JP 2014-147 A
Patent Document 2: JP 2014-188063 A
Patent Document 3: JP 2019-17865 A

SUMMARY OF INVENTION

Technical Problem

In a case where an information terminal such as a smartphone cooperates with a blood pressure monitor, integration of the information terminal and the blood pressure monitor allows usability of the blood pressure monitor to be improved. For example, this configuration makes blood pressure measurement easier than a configuration in which the blood pressure is measured with the information terminal in hand, and makes a display screen of the information terminal easier to see than a configuration in which the information terminal is disposed at another location such as on a desk.

However, for example, in the configuration of Patent Document 1, the portable wireless communication terminal can be disposed on the blood pressure monitor, and thus a liquid crystal display unit of the portable wireless communication terminal is disposed next to a liquid crystal display unit of the blood pressure monitor.

Consequently, a user simultaneously views the liquid crystal display unit of the portable wireless communication terminal and the liquid crystal display unit of the blood pressure monitor. Thus, the user is confused as to which liquid crystal display unit is to be viewed in order to confirm a result of measurement. Additionally, Patent Documents 2 and 3 disclose no means for solving such a problem.

In an aspect, the present invention has been made in light of such circumstances, and an object of the present invention is to provide a technology that enables information display that is easily understandable to the user.

Solution to Problem

The present invention adopts the following configurations to solve the above-described problems. In other words, a measurement device according to an aspect of the present invention includes a measurement unit configured to perform measurement of biological information, a first display unit configured to display a result of the measurement performed by the measurement unit, an installation unit configured to install an information terminal on the installation unit, the information terminal including a second display unit configured to display the result of the measurement, a communication unit configured to communicate with the information terminal, and a control unit configured to cause the result of the measurement to be transmitted from the communication unit to the information terminal to cause the second display unit to display the result of the measurement, wherein, while the information terminal is installed on the installation unit, the result of the measurement is prevented from being visually recognized on the first display unit. The biological information is information such as blood pressure which can be measured from the living body of a subject.

In the configuration described above, with the information terminal installed on the installation unit, the result of the measurement is prevented from being visually recognized on the first display unit of the measurement device. This allows the user to visually recognize the result of the measurement only on the second display unit of the information terminal. This enables avoidance of redundant display of the result of the measurement both on the first display unit of the measurement device and on the second display unit the information display, making the user confused. Thus, information display can be provided that is easily understandable to the user.

In the measurement device according to the aspect described above, the first display unit may be provided at a position where with the information terminal installed on the installation unit, the first display unit is shielded from the user by the information terminal. In this configuration, with the information terminal installed on the installation unit for the information terminal, the first display unit of the measurement device is invisible to the user, and thus the user can easily recognize that the result of the measurement is displayed on the second display unit of the information terminal. This enables information display that is more easily understandable to the user.

In the measurement device according to the aspect described above, the installation unit may include a first surface configured to enable a side portion of the information terminal to be placed on the first surface and a second surface configured to enable the information terminal with the side portion placed on the first surface to be set against the second surface, the second surface extending in a direction intersecting the first surface. In this configuration, with the side portion of the information terminal installed on the first surface and with the information terminal set against the second surface, the position of the information terminal can be stabilized by gravity. Additionally, with the information terminal set against the second surface, the second display unit of the information terminal is inclined, allowing the user to easily visually recognize the result of the measurement displayed on the second display unit.

In the measurement device according to the aspect described above, a direction in which the second surface intersects the first surface may be a longitudinal direction of the second surface, and the first display unit may be provided at a position on the second surface that is close to the first surface. In this configuration, even in a first state in which a side portion of the information terminal extending in a lateral direction contacts the first surface, the information terminal can be stably supported. In addition, the information terminal is positioned in contact with the first surface by gravity, and thus even in the first state in which the side portion of the information terminal extending in the lateral direction contacts the first surface or in a second state in which the side portion of the information terminal extending in the longitudinal direction contacts the first surface, the information terminal can shield the first display unit.

In the measurement device according to the aspect described above, the installation unit may be configured to install the information terminal on the installation unit in the first state in which the side portion of the information terminal extending in the lateral direction contacts the first surface and in the second state in which the side portion of the information terminal extending in the longitudinal direction contacts the first surface, and the first display unit may be provided at a position on the second surface where the first display unit is shielded by the information terminal both in the first state and in the second state. In this configuration, regardless of whether the information terminal is installed in the first state or in the second state, the first display unit can be shielded by the information terminal.

In the measurement device according to the aspect described above, the control unit may be configured to perform control to reduce power consumption of the first display unit in a case where the information terminal is installed on the installation unit compared with a case where the information terminal is not installed on the installation unit. In this configuration, the power consumption of the first display unit is reduced by turning off the first display unit, or the like; the result of the measurement is prevented from being visually recognized on the first display unit. This enables a reduction in the power consumption of the measurement device without affecting the display of the result of the measurement to the user.

The measurement device according to the aspect described above may include an operation unit configured to enable reception of a start instruction for the measurement from the user while the information terminal is installed on the installation unit. In this configuration, even with the information terminal installed on the installation unit, the measurement can be started by operating the operation unit of the measurement device.

In the measurement device according to the aspect described above, the installation unit may be configured not to block at least one of a microphone and a speaker of the information terminal installed on the installation unit. This allows suppression of interference with input and output of sound in the information terminal installed on the installation unit.

The measurement device according to the aspect described above may include a charging unit configured to charge a rechargeable battery for the information terminal installed on the installation unit. In this configuration, the information terminal installed in the measurement device enables charging of the rechargeable battery for the information terminal in addition to the cooperation between the measurement device and the information terminal, allowing improvement of convenience for the user.

In the measurement device according to the aspect described above, the control unit may be configured to perform control to stop the charging or reduce magnetism of the charging in a case where the measurement unit performs the measurement. In this configuration, a possible adverse effect of the charging on the measurement can be suppressed.

In addition, an aspect of the present invention provides an information terminal for cooperating with a measurement device, the measurement device including a first display unit configured to display a result of measurement of biological information, the information terminal including a communication unit configured to communicate with the measurement device, a second display unit configured to display the result of the measurement, and a control unit configured to cause a command to be transmitted from the communication unit to the measurement device, the command being for reducing power consumption of the first display unit in a state in which the information terminal itself is installed on an installation unit provided in the measurement device compared with a state in which the information terminal itself is not installed on the installation unit, wherein, while the terminal itself is installed on the installation unit provided in the measurement device, the result of the measurement is prevented from being visually recognized on the first display unit. In this configuration, the power consumption of the first display unit is reduced by turning off the first display unit, or the like; the result of the measurement is prevented from being visually recognized on the first display unit. This enables a reduction in the power consumption of the measurement device without affecting the display of the result of the measurement to the user. The terminal itself means the terminal itself based on the information terminal, that is, the information terminal itself.

The information terminal according to the aspect described above may include a detection unit configured to detect the terminal itself being installed on the installation unit. In this configuration, even in a case where the detection unit for detecting the information terminal being installed on the installation unit is not provided on the side of the measurement device, the installation of the information terminal in the installation unit can be detected, enabling the cooperation between the measurement device and the information terminal.

In the information terminal according to the aspect described above, the control unit may be configured to perform control to stop at least a portion of the wireless communication performed by the terminal itself or to reduce magnetism of the wireless communication in a case where the measurement device performs the measurement. In this configuration, a possible adverse effect of the wireless communication on the measurement can be suppressed.

In addition, an aspect of the present invention provides a control program for an information terminal configured to cooperate with a measurement device, the information terminal including a first display unit configured to display a result of measurement of biological information, the information terminal including a second display unit configured to display the result of the measurement, the information terminal being capable of communicating with the measurement device and preventing the result of the measurement from being visually recognized on the first display unit while the information terminal itself is installed on an installation unit provided in the measurement device, the control program causing a computer to execute the steps of displaying the result of the measurement on the second display unit and transmitting a command to the measurement device, the command being for reducing power consumption of the first display unit in a state in which the terminal itself is installed on the installation unit provided in the measurement device compared with a state in which the terminal itself is not installed on the installation unit.

In addition, a measurement system according to an aspect of the present invention includes a measurement device including a first display unit configured to display a result of measurement of biological information, and an information terminal configured to communicate with the measurement device, the information terminal including a second display unit configured to display the result of the measurement, wherein, while the information terminal is installed on the installation unit, the result of the measurement is prevented from being visually recognized on the first display unit.

Advantageous Effects of Invention

The present invention provides a technology for information display that is easily understandable to the user.

BRIEF DESCRIPTION OF DRAWINGS

FIG. 1 is a diagram illustrating an example of a measurement system 10 to which the present invention is applied.

FIG. 2 is a diagram illustrating an example of a state in which a smartphone 14 is installed on an installation stand 111 of a blood pressure monitor 100.

FIG. 3 is a diagram illustrating an example of hardware of a body 110 of the blood pressure monitor 100.

FIG. 4 is a diagram illustrating an example of hardware of the smartphone 14.

FIG. 5 is a diagram illustrating an example of a block configuration of the blood pressure monitor 100.

FIG. 6 is a diagram illustrating an example of a block configuration of the smartphone 14.

FIG. 7 is a flowchart illustrating an example of processing by the smartphone 14.

FIG. 8 is a flowchart illustrating an example of processing by the blood pressure monitor 100.

FIG. 9 is a flowchart illustrating an example of processing of step S82 illustrated in FIG. 8.

FIG. 10 is a flowchart illustrating an example of processing of step S86 illustrated in FIG. 8.

FIG. 11 is a sequence diagram illustrating an operation example of a measurement system 10.

FIG. 12 is a diagram illustrating an example of display of a result of blood pressure measurement performed by the blood pressure monitor 100.

FIG. 13 is a diagram illustrating an example of a portal screen of an application in the smartphone 14.

FIG. 14 is a diagram illustrating an example of a measurement pre-start screen of the smartphone 14.

FIG. 15 is a diagram illustrating an example of display of a result of blood pressure measurement performed by the smartphone 14.

FIG. 16 is a diagram illustrating an example of a history display screen of the smartphone 14.

FIG. 17 is a diagram illustrating a modified example of an installation stand 111 of the blood pressure monitor 100.

DESCRIPTION OF EMBODIMENTS

Embodiments according to an aspect of the present invention will be described below based on the drawings.

§ 1 Application Example

Measurement System 10 to which Present Invention is Applied

FIG. 1 is a diagram illustrating an example of a measurement system 10 to which the present invention is applied. The measurement system 10 is a system for measuring the blood pressure of a user and displaying the result of the measurement to the user. The blood pressure is an example of "biological information". The measurement system 10 includes a blood pressure monitor 100 and a smartphone 14. The blood pressure monitor 100 is an example of a "measurement device" of the present invention. The smartphone 14 is an example of an "information terminal" of the present invention.

In the measurement system 10, the blood pressure monitor 100 and the smartphone 14 cooperate. The cooperation between the blood pressure monitor 100 and the smartphone 14 includes, for example, the display by the smartphone 14 of the result of the blood pressure measurement performed by the blood pressure monitor 100. In addition, the cooperation between the blood pressure monitor 100 and the smartphone 14 includes, for example, the control by the smartphone 14 of the start or stop of blood pressure measurement performed by the blood pressure monitor 100.

The blood pressure monitor 100 includes a body 110, a cuff 121, and an air tube 122. The body 110 is connected to the cuff 121 via the air tube 122, and the cuff 121 is used to measure the blood pressure of the user, for example, by an oscillometric method. The configuration of the cuff 121 and the blood pressure measurement using the cuff 121 will be described below.

The body 110 includes an installation stand 111, a liquid crystal display 112, and a measurement start switch 113. The installation stand 111 is an example of an "installation unit" of the present invention. The liquid crystal display 112 is a "first display unit" of the present invention. The measurement start switch 113 is an "operation unit" of the present invention.

The installation stand 111 is a portion on which the smartphone 14 can be installed relative to the body 110. By installing the smartphone 14 on the installation stand 111, the blood pressure monitor 100 and the smartphone 14 can be integrated, stabilizing communication between the blood pressure monitor 100 and the smartphone 14.

For example, in a configuration in which wireless communication is performed between the blood pressure monitor 100 and the smartphone 14, the smartphone 14 is installed at a predetermined position in the blood pressure monitor 100, thus allowing stably high radio quality to be ensured. Additionally, measurement can be started after the blood pressure monitor 100 and the smartphone 14 check mutual connections, allowing suppression of a possible communication error during or after measurement, and a possible loss of measurement data or the like.

By stabilizing the communication between the blood pressure monitor 100 and the smartphone 14, the cooperation between the blood pressure monitor 100 and the smartphone 14 can be stabilized. The configuration of the installation stand 111 will be described below. Note that, even with the smartphone 14 not installed on the installation stand 111 of the body 110, the blood pressure monitor 100 and the smartphone 14 can communicate wirelessly as long as the blood pressure monitor 100 and the smartphone 14 are located close to each other.

The liquid crystal display 112 can display the result of the blood pressure measurement performed by the blood pressure monitor 100. Since the blood pressure monitor 100 includes the liquid crystal display 112, the blood pressure monitor 100 can display the result of measurement of blood pressure of the user without the smartphone 14.

The measurement start switch 113 is a press switch that receives a start instruction for blood pressure measurement performed by the blood pressure monitor 100. Since the blood pressure monitor 100 includes the measurement start switch 113, the blood pressure monitor 100 can start the measurement of blood pressure of the user without the smartphone 14. Additionally, the measurement start switch 113 is provided at a position where the measurement start switch 113 can be operated even when the smartphone 14 is installed on the installation stand 111.

The smartphone 14 is an information terminal that can communicate with the blood pressure monitor 100. Additionally, the smartphone 14 includes a touch panel 14a. The touch panel 14a is a "second display unit" of the present invention. The touch panel 14a can display the result of measurement of the blood pressure by the blood pressure monitor 100.

FIG. 2 is a diagram showing an example of the smartphone 14 installed on the installation stand 111 of the blood pressure monitor 100. As illustrated in FIG. 2, when the smartphone 14 is installed on the installation stand 111 of the blood pressure monitor 100, the liquid crystal display 112 of the blood pressure monitor 100 is shielded from the user by the smartphone 14. The smartphone 14 receives the result of blood pressure measurement from the blood pressure monitor 100, and displays, on the touch panel 14a, the received result of blood pressure measurement.

Thus, with the smartphone 14 installed, the result of blood pressure measurement is prevented from being visually recognized on the liquid crystal display 112. In other words, of the liquid crystal display 112 and the touch panel 14a, the user can visually recognize the result of blood pressure measurement only on the touch panel 14a.

This allows avoidance of the user being confused by redundant display of the result of blood pressure measurement on both the liquid crystal display 112 of the blood pressure monitor 100 and the touch panel 14a of the smartphone 14 in a case where the smartphone 14 is installed on the installation stand 111 and integrated with the blood pressure monitor 100. This enables information display that is easily understandable to the user.

Furthermore, since the liquid crystal display 112 is shielded by the smartphone 14, the touch panel 14a is the only display unit that can be visually recognized by the user, and the user can easily recognize that the result of blood pressure measurement is displayed on the touch panel 14a. This enables information display that is more easily understandable to the user.

As illustrated in FIGS. 1 and 2, the measurement system 10 allows the blood pressure monitor 100 and the smartphone 14 to cooperate stably, and enables information display that is easily understandable to the user.

Additionally, in the body 110, the liquid crystal display 112 may be turned off while the smartphone 14 is installed on the installation stand 111. The turning off is an example of "reducing the power consumption of the first display unit". The liquid crystal display 112 is turned off, for example, by a command from the smartphone 14 installed on the installation stand 111.

Thus, with the smartphone 14 installed on the installation stand 111, by turning off the liquid crystal display 112 shielded by the smartphone 14, the power consumption of the blood pressure monitor 100 can be reduced without affecting the information display to the user.

§ 2 Configuration Example

Configuration of Blood Pressure Monitor 100
Configuration of Cuff 121

The cuff 121 illustrated in FIGS. 1 and 2 is a bag-like arm band wrapped around the upper arm or the like of the user, and the cuff 121 is pressurized and depressurized under the control of the body 110. The body 110 measures the blood pressure of the user by using a pressure sensor to detect the pressure (cuff pressure) inside the cuff 121.

Configuration of Installation Stand 111

The installation stand 111 illustrated in FIGS. 1 and 2 includes a bottom portion 111a, a set-against surface 111b, and an anti-slip portion 111c. The bottom portion 111a is a "first surface" of the present invention. The set-against surface 111b is an example of a "second surface" of the present invention. A side portion of the smartphone 14 can be placed on the bottom portion 111a, which supports the placed smartphone 14 from below (in the direction of gravity).

The set-against surface 111b is a surface located adjacent to the bottom portion 111a and extending in a direction intersecting the bottom portion 111a, and the smartphone 14 placed on the bottom portion 111a can be set against the set-against surface 111b. Additionally, the set-against surface 111b is inclined with respect to the vertical direction, and obliquely supports the smartphone 14. By placing the smartphone 14 on the bottom portion 111a and setting the smartphone 14 against the set-against surface 111b, the smartphone 14 can be easily installed in place in the body 110, and the position of the smartphone 14 can be stabilized by gravity. Additionally, by setting the smartphone 14 against the set-against surface 111b, the touch panel 14a of the smartphone 14 is inclined, facilitating the visual recognition by the user of the result of blood pressure measurement displayed on the touch panel 14a.

The anti-slip portion 111c is a portion located adjacent to the bottom portion 111a opposite to the set-against surface 111b and protruding upward. The anti-slip portion 111c can prevent the smartphone 14 from slipping against the bottom portion 111a and the set-against surface 111b and shifting from the predetermined position of the body 110.

Additionally, the smartphone 14, having a generally rectangular plate shape, can be installed on the installation stand 111 in a vertical state in which a side portion of the smartphone 14 extending in the lateral direction contacts the bottom portion 111a (see FIG. 2), or in a horizontal state in which a side portion of the smartphone 14 extending in the longitudinal direction contacts the bottom portion 111a (not illustrated). The vertical state is an example of a "first state"

of the present invention. The horizontal state is a "second state" of the present invention.

In addition, the longitudinal direction of the set-against surface 111*b* corresponds to the direction in which the set-against surface 111*b* intersects the bottom portion 111*a*. Thus, even in a case where the smartphone 14 is installed on the installation stand 111 in the vertical state, the smartphone 14 can be stably supported. Additionally, the liquid crystal display 112 is provided at a position on the set-against surface 111*b* that is close to the bottom portion 111*a*. For example, the liquid crystal display 112 is provided such that the center of the liquid crystal display 112 is located closer to the bottom portion 111*a* than the center of the set-against surface 111*b* in the direction intersecting the bottom portion 111*a*. Thus, the liquid crystal display 112 is provided at a position on the set-against surface 111*b* where the liquid crystal display 112 is shielded by the smartphone 14 both in the vertical state and in the horizontal state. Thus, regardless of whether the smartphone 14 is installed in the vertical state or in the horizontal state, the display can be shielded by the smartphone 14.

Hardware

Hardware of Body 110 of Blood Pressure Monitor 100

FIG. 3 is a diagram illustrating a part of a hardware example of the body 110 of the blood pressure monitor 100. The body 110 of the blood pressure monitor 100 illustrated in FIGS. 1 and 2 can be implemented by a computer 30 illustrated in FIG. 3, for example.

The computer 30 includes a processor 31, a memory 32, a communication interface 33, and a user interface 34. The processor 31, the memory 32, the communication interface 33, and the user interface 34 are connected by, for example, a bus 39.

The processor 31 is a processing device that executes signal processing. For example, the processor 31 includes a general-purpose processor such as a central processing unit (CPU), a programmable logic device such as a field programmable gate array (FPGA), or an application specific circuit such as application specific integrated circuit (ASIC), or a combination thereof.

The memory 32 is a storage device that stores information, and includes, for example, a main memory and an auxiliary memory. The main memory is, for example, a random access memory (RAM), and is used as a work area of the processor 31.

The auxiliary memory is a non-volatile memory, for example, a magnetic disk, a flash memory, or the like. The auxiliary memory stores various programs for operating the computer 30. The programs stored in the auxiliary memory are loaded into the main memory and executed by the processor 31.

Also, the auxiliary memory may include a portable memory removable from the computer 40. The portable memory includes a memory card such as a universal serial bus (USB) flash drive or a secure digital (SD) memory card.

The communication interface 33 communicates with a device outside the computer 30 (e.g., smartphone 14). The communication interface 33 is controlled by the processor 31. For example, the communication interface 33 performs wireless communication with the smartphone 14. For the wireless communication, a near-field wireless communication scheme can be used, for example, Bluetooth, Bluetooth low energy (LE), near field communication (NFC), Wi-Fi Direct, or the like. Note that Bluetooth, Bluetooth LE, and Wi-Fi Direct are trade names.

The user interface 34 includes, for example, an input device receiving an operation input from the user, an output device outputting information to a user, and the like. The input device includes, for example, press buttons, slide switches, a remote controller, and the like. The output device includes, for example, a display, a speaker, and the like. Additionally, the input device and the output device may include a touch panel or the like. The user interface 34 is controlled by the processor 31. The liquid crystal display 112 and the measurement start switch 113 illustrated in FIGS. 1 and 2 are included in the user interface 34.

Hardware of Smartphone 14

FIG. 4 is a diagram illustrating an example of hardware of the smartphone 14. The smartphone 14 illustrated in FIGS. 1 and 2 can be implemented by, for example, a computer 40 illustrated in FIG. 4. The computer 40 includes a processor 41, a memory 42, a communication interface 43, and a user interface 44. The processor 41, the memory 42, the communication interface 43, and the user interface 44 are connected by, for example, a bus 49.

The processor 41 is a processing device that executes signal processing. For example, the processor 41 includes a general-purpose processor such as a CPU, a programmable logic device such as a FPGA, or an application specific circuit such as an ASIC, or a combination thereof.

The memory 42 is a storage device that stores information, and includes, for example, a main memory and an auxiliary memory. The main memory is, for example, a RAM and is used as a work area for the processor 41.

The auxiliary memory is a non-volatile memory, for example, a magnetic disk, a flash memory, or the like. The auxiliary memory stores various programs for operating the computer 40. The programs stored in the auxiliary memory are loaded into the main memory and executed by the processor 41. Also, the auxiliary memory may include a portable memory removable from the computer 40. The portable memory includes a memory card such as a USB flash drive or an SD memory card.

The communication interface 43 communicates with a device outside the computer 40 (e.g., the body 110). The communication interface 43 is controlled by the processor 41. For example, the communication interface 43 performs wireless communication with the body 110. For the wireless communication, a near-field wireless communication scheme can be used, for example, Bluetooth, NFC, Wi-Fi Direct, or the like.

The user interface 44 includes, for example, an input device receiving an operation input from the user, an output device outputting information to the user, and the like. The input device can be implemented, for example, by press buttons, a microphone, keys (e.g., a keyboard), a remote controller, and the like. The output device can be implemented, for example, by a display, a speaker, and the like. The input device and the output device may also be implemented by a touch panel or the like. The user interface 44 is controlled by processor 41. The touch panel 14*a* illustrated in FIGS. 1 and 2 is included in the user interface 44.

Block Configuration

Block Configuration of Blood Pressure Monitor 100

FIG. 5 is a diagram illustrating an example of a block configuration of the blood pressure monitor 100. As illustrated in FIG. 5, the blood pressure monitor 100 includes, for example, a measurement unit 51, a first display unit 52, an installation unit 53, a communication unit 54, a control unit 55, and an operation unit 56.

The measurement unit 51 measures blood pressure (biological information). The measurement unit 51 includes, for example, the cuff 121 and the air tube 122 illustrated in FIGS. 1 and 2, and a pressure sensor (not illustrated)

included in the body 110. The first display unit 52 can display the result of measurement performed by the measurement unit 51. The first display unit 52 includes, for example, the liquid crystal display 112 illustrated in FIGS. 1 and 2.

The smartphone 14 (information terminal) can be installed on the installation unit 53. The installation unit 53 includes, for example, the installation stand 111 illustrated in FIGS. 1 and 2. The communication unit 54 can communicate directly with the smartphone 14 installed on the installation unit 53. Being capable of communicating directly means being capable of communicating without a network, for example. The communication unit 54 includes, for example, the communication interface 33 illustrated in FIG. 3.

By transmitting the result of the blood pressure measurement performed by the measurement unit 51 from the communication unit 54 to the smartphone 14 while the smartphone 14 is installed on the installation unit 53, the control unit 55 causes the touch panel 14a of the smartphone 14 to display the result of the blood pressure measurement performed by the measurement unit 51. Additionally, the control unit 55 may reduce the power consumption of the first display unit 52 in a case where the smartphone 14 is installed on the installation unit 53 compared with a case where the smartphone 14 is not installed on the installation unit 53. The control unit 55 includes, for example, the processor 31 and the memory 32 illustrated in FIG. 3.

With the smartphone 14 installed on the installation unit 53, the operation unit 56 can receive, from the user, a measurement start instruction to cause the measurement unit 51 to start measurement. The operation unit 56 includes, for example, the measurement start switch 113 illustrated in FIGS. 1 and 2.

Block Configuration of Smartphone 14

FIG. 6 is a diagram illustrating an example of a block configuration of the smartphone 14. As illustrated in FIG. 6, the smartphone 14 includes, for example, a communication unit 61, a second display unit 62, a control unit 63, and a detection unit 64.

The communication unit 61 can communicate directly with the blood pressure monitor 100 while the smartphone 14 is located near the blood pressure monitor 100, for example, while the smartphone 14 is installed on the installation part 53 of the blood pressure monitor 100 illustrated in FIG. 5. The communication unit 61 includes, for example, the communication interface 43 illustrated in FIG. 4.

The second display unit 62 displays the result of the blood pressure measurement performed by the blood pressure monitor 100 while the smartphone 14 is installed on the installation unit 53 of the blood pressure monitor 100 illustrated in FIG. 5. The second display unit 62 includes, for example, the touch panel 14a illustrated in FIGS. 1 and 2.

The control unit 63 reduces the power consumption of the liquid crystal display 112 (first display part) of the blood pressure monitor 100 when the smartphone 14 is installed on the installation unit 53 of the blood pressure monitor 100 illustrated in FIG. 5 compared with when the smartphone 14 is not installed on the installation unit 53. For example, with the smartphone 14 installed on the installation unit 53 of the blood pressure monitor 100 illustrated in FIG. 5, the control unit 63 controls to cause the liquid crystal display 112 to be turned off by transmitting a control signal from the communication unit 61 to the blood pressure monitor 100. The controller 63 includes, for example, the processor 41 and the memory 42 illustrated in FIG. 4.

The detection unit 64 detects the smartphone 14 being installed on the installation unit 53 of the blood pressure monitor 100 illustrated in FIG. 5. For example, the detection unit 64 detects the smartphone 14 being installed on the installation unit 53 of the blood pressure monitor 100, depending on whether the communication unit 61 can perform near-field wireless communication with the blood pressure monitor 100 by NFC or the like.

Alternatively, the detection unit 64 may include a proximity sensor that detects the proximity of the smartphone 14 to the blood pressure monitor 100. The proximity sensor may be any of various proximity sensors such as an inductive proximity sensor, a capacitive proximity sensor, and a magnetic proximity sensor.

Processing of Each Device

Processing by Smart Phone 14

FIG. 7 is a flowchart illustrating an example of processing by the smartphone 14. The smartphone 14 executes the processing illustrated in FIG. 7 when an application cooperating with the blood pressure monitor 100 is launched in the smartphone 14.

First, the smartphone 14 determines whether the smartphone 14 has been installed on the installation stand 111 of the blood pressure monitor 100 (step S71), and waits until the smartphone 14 is installed on the installation stand 111 of the blood pressure monitor 100 (step S71: loop of No).

In step S71, when the smartphone 14 is installed on the installation stand 111 of the blood pressure monitor 100 (step S71: Yes), the smartphone 14 displays a measurement pre-start screen on the touch panel 14a (step S72). The measurement pre-start screen is, for example, a screen including a measurement start button for prompting the user to wear the cuff 121 and instructing the user to start blood pressure measurement using the blood pressure monitor 100 (see, for example, FIG. 14). The user attaches the cuff 121 to the upper arm of the user or the like in accordance with the measurement pre-start screen, and subsequently touches the measurement start button on the measurement pre-start screen.

Then, the smartphone 14 determines whether the user has performed a measurement start operation instructing the smartphone 14 to start blood pressure measurement using the blood pressure monitor 100 (step S73), and waits until the measurement start operation is performed (step S73: loop of No). The measurement start operation includes, for example, touching the measurement start button described above and displayed on the touch panel 14a.

When the measurement start operation is performed in step S73 (step S73: Yes), the smartphone 14 transmits, to the blood pressure monitor 100, a measurement start signal instructing the start of blood pressure measurement (step S74).

Then, the smartphone 14 determines whether the result of blood pressure measurement has been received from the blood pressure monitor 100 (step S75). In a case where the result of blood pressure measurement has not been received (step S75: No), the smartphone 14 determines whether measurement in-progress information has been received (step S76). The measurement in-progress information is information related to the process of blood pressure measurement, as described below.

In step S76, in a case where no measurement in-progress information is received (step S76: No), the smartphone 14 returns to step S75. In a case where the measurement in-progress information is received (step S76: Yes), the smartphone 14 displays the received measurement in-progress information on the touch panel 14a (step S77), and returns to step S75.

In step S75, when the result of blood pressure measurement is received (step S75: Yes), the smartphone 14 displays the received result of blood pressure measurement on the touch panel 14a (step S78), and returns to step S71. The display of the result of blood pressure measurement by the smartphone 14 will be described with reference to FIG. 15.

Processing by Blood Pressure Monitor 100

FIG. 8 is a flowchart illustrating an example of processing by the blood pressure monitor 100. The blood pressure monitor 100 executes the processing illustrated in FIG. 8 when the blood pressure monitor 100 is turned on, for example.

First, the blood pressure monitor 100 determines whether the measurement start switch 113 has been pressed (step S81). In a case where the measurement start switch 113 is pressed (step S81: Yes), the blood pressure monitor 100 performs blood pressure measurement while displaying the measurement in-progress information on the liquid crystal display 112 (step S82). The measurement in-progress information is information such as a pressure value of the cuff 121 related to the process of blood pressure measurement. Processing of blood pressure measurement in step S82 will be described below with reference to FIG. 9.

Then, the blood pressure monitor 100 displays the result of the blood pressure measurement in step S82 on the liquid crystal display 112 (step S83), and returns to step S81. A specific example of the result of the blood pressure measurement in step S83 will be described below with reference to FIG. 12.

In step S81, in a case where the measurement start switch 113 is not pressed (step S81: No), the blood pressure monitor 100 determines whether the measurement start signal described above has been received from the smartphone 14 (step S84). In a case where the measurement start signal is not received (step S84: No), the blood pressure monitor 100 returns to step S81.

In step S84, in a case where the measurement start signal is received (step S84: Yes), the blood pressure monitor can determine that the smartphone 14 is installed on the installation stand 111 of the blood pressure monitor 100 and that the measurement start operation described above has been performed on the smartphone 14. In this case, the blood pressure monitor 100 turns off the liquid crystal display 112 (step S85).

Then, the blood pressure monitor 100 performs blood pressure measurement while transmitting the measurement in-progress information to the smartphone 14 (step S86). The processing of blood pressure measurement in step S86 will be described below with reference to FIG. 10. Then, the blood pressure monitor 100 transmits the result of the blood pressure measurement obtained in step S86 to the smartphone 14 (step S87), and returns to step S81.

FIG. 9 is a flowchart illustrating an example of processing of step S82 illustrated in FIG. 8. In step S82 illustrated in FIG. 8, the blood pressure monitor 100 executes the processing illustrated in FIG. 9 as processing for performing blood pressure measurement while displaying the measurement in-progress information.

First, the blood pressure monitor 100 performs pre-measurement calibration (step S91). The pre-measurement calibration includes, for example, calibration of sensing by the cuff 121, and calibration of communication between the blood pressure monitor 100 and the smartphone 14.

Then, the blood pressure monitor 100 starts pressurization of the cuff 121 (step S92). Then, the blood pressure monitor 100 displays the current pressure value of the cuff 121 on the liquid crystal display 112 as the measurement in-progress information described above (step S93). Then, the blood pressure monitor 100 determines whether the current pressure value of the cuff 121 has reached a predetermined upper limit (step S94). In a case where the pressure value has not reached the upper limit (step S94: No), the blood pressure monitor 100 returns to step S93.

In step S94, in a case where the pressure value reaches the upper limit (step S94: Yes), the blood pressure monitor 100 starts depressurization of the cuff 121 (step S95). Then, the blood pressure monitor 100 displays the current pressure value of the cuff 121 on the liquid crystal display 112 as the measurement in-progress information described above (step S96). Then, the blood pressure monitor 100 determines whether the current pressure value of the cuff 121 has reached a predetermined lower limit (step S97). In a case where the pressure value does not reach the lower limit (step S97: No), the blood pressure monitor 100 returns to step S96.

In step S97, in a case where the pressure value reaches the lower limit (step S97: Yes), the blood pressure monitor 100 references changes in cuff pressure obtained in steps S92 to S97 to calculate the blood pressure value of the user based on the oscillometric method (step S98). The blood pressure value calculated in step S98 is, for example, the maximum blood pressure value and the minimum blood pressure value. Additionally, in step S98, other information such as pulse rate may be calculated together with the blood pressure value.

Then, the blood pressure monitor 100 quickly exhausts the cuff 121 (step S99), and terminates the series of processing operations. In step S83 illustrated in FIG. 8, the blood pressure monitor 100 displays the blood pressure value calculated by step S98, on the liquid crystal display 112 as the result of the blood pressure measurement.

FIG. 10 is a flowchart illustrating an example of processing of step S86 illustrated in FIG. 8. In step S86 illustrated in FIG. 8, the blood pressure monitor 100 executes, for example, the processing illustrated in FIG. 10 as processing for performing blood pressure measurement while transmitting the measurement in-progress information.

Steps S101 to S109 illustrated in FIG. 10 are similar to steps S91 to S99 illustrated in FIG. 9. However, in steps S103 and S106, the blood pressure monitor 100 transmits the current pressure value of the cuff 121 to the smartphone 14 as the measurement in-progress information described above. Additionally, in step S87 illustrated in FIG. 8, the blood pressure monitor 100 transmits the blood pressure value calculated in step S108 to the smartphone 14 as the result of the blood pressure measurement.

§ 3 Operation Example

Operation Example of System
Operation Example of Measurement System 10

FIG. 11 is a sequence diagram illustrating an operation example of the measurement system 10. With reference to FIG. 11, a description will be given for processing that is executed in a case where the blood pressure is measured with the smartphone 14 installed on the installation stand 111 of the blood pressure monitor 100.

First, it is assumed that the smartphone 14 is installed on the installation stand 111 of the blood pressure monitor 100 (step S111). Then, the smartphone 14 detects the smartphone 14 itself being installed on the installation stand 111 of the blood pressure monitor 100 (step S112).

Then, the smartphone 14 displays the measurement pre-start screen on the touch panel 14a (step S113), and receives the measurement start operation (step S114). Then, in response to receiving the measurement start operation, the smartphone 14 transmits the measurement start signal described above to the blood pressure monitor 100 (step S115).

Then, in response to receiving the measurement start signal, the blood pressure monitor 100 turns off the liquid crystal display 112 (step S116), and performs blood pressure measurement while transmitting the measurement in-progress information to the smartphone 14 (step S117). During this time, the smartphone 14 displays, on the touch panel 14a, the received measurement in-progress information from the blood pressure monitor 100 (step S118).

Then, the blood pressure monitor 100 transmits the result of the blood pressure measurement obtained in step S117 to the smartphone 14 (step S119). Then, the smartphone 14 displays, on the touch panel 14a, the result of the blood pressure measurement received in step S119 (step S120), and terminates the series of processing operations.

Display Example
Display of Result of Blood Pressure Measurement Performed by Blood Pressure Monitor 100

FIG. 12 is a diagram illustrating an example of display of the result of the blood pressure measurement performed by the blood pressure monitor 100. When the blood pressure monitor 100 performs blood pressure measurement while the smartphone 14 is not installed on the installation stand 111, the blood pressure monitor 100 displays the result of the blood pressure measurement on the liquid crystal display 112. In the example illustrated in FIG. 12, the liquid crystal display 112 displays, as the result of blood pressure measurement, the date and time of the blood pressure measurement ("09/05, 15:35"), the maximum blood pressure value ("SYS 120"), the minimum blood pressure value ("DIA 80"), and the pulse rate ("PULSE 82").

Portal Screen of Application in Smartphone 14

FIG. 13 is a diagram illustrating an example of a portal screen of an application in the smartphone 14. When an application cooperating with the blood pressure monitor 100 is launched in smartphone 14, the smartphone 14 displays a portal screen 130 illustrated in FIG. 13 on the touch panel 14a, for example. Note that the application may be launched by using, as a trigger, installation of the smartphone 14 on the installation stand 111 of the blood pressure monitor 100.

The portal screen 130 includes buttons for invoking processing operations of the application, including a measurement button 131, a measurement history button 132, and the like. The measurement button 131 is a button that invokes the measurement pre-start screen (see, for example, FIG. 14) for performing blood pressure measurement using the blood pressure monitor 100. The measurement history button 132 is a button that invokes a history display screen (see, for example, FIG. 16) that displays a history of the result of the blood pressure measurement performed by the blood pressure monitor 100.

Measurement Pre-Start Screen of Smartphone 14

FIG. 14 is a diagram illustrating an example of the measurement pre-start screen of the smartphone 14. When the user touches the measurement button 131 illustrated in FIG. 13, the smartphone 14 displays, on the touch panel 14a, for example, a measurement pre-start screen 140 illustrated in FIG. 14.

In the example illustrated in FIG. 14, the smartphone 14 is installed on the installation stand 111 of the blood pressure monitor 100, but in a case where the smartphone 14 is not installed on the installation stand 111 of the blood pressure monitor 100 at this point, the smartphone 14 may display, on the touch panel 14a, a screen for prompting the user to install the smartphone 14 on the installation stand 111 of the blood pressure monitor 100. In this case, the smartphone 14 displays the pre-start measurement screen 140 on the touch panel 14a after the smartphone 14 is installed on the installation stand 111 of the blood pressure monitor 100.

The measurement pre-start screen 140 includes a text message 141 and a measurement start button 142. The text message 141 is a message prompting the user to touch the measurement start button 142 after the user wraps the cuff 121 around the arm. The measurement start button 142 is a button for instructing the blood pressure monitor 100 to start blood pressure measurement.

When the measurement start button 142 is touched, the smartphone 14 transmits the measurement start signal described above to the blood pressure monitor 100. Thus, blood pressure measurement is started in the blood pressure monitor 100, and the result of the blood pressure measurement is transmitted from the blood pressure monitor 100 to the smartphone 14.

Display of Result of Blood Pressure Measurement Performed by Smartphone 14

FIG. 15 is a diagram illustrating an example of display of the result of blood pressure measurement performed by the smartphone 14. When receiving the result of blood pressure measurement from the blood pressure monitor 100, the smartphone 14 installed on the installation stand 111 displays, on the touch panel 14a, the measurement result screen 150 indicating the result of blood pressure measurement. The measurement result screen 150 includes, in addition to the character string "Measurement Complete," information similar to the result of blood pressure measurement illustrated in FIG. 12 as the result of blood pressure measurement.

However, the display manner used in a case where the smartphone 14 presents the result of blood pressure measurement may differ from the one used in a case where the blood pressure monitor 100 presents the result of blood pressure measurement. For example, typically, the touch panel 14a of the smartphone 14 has a large number of pixels, colors, character types, and the like that can be displayed compared to the liquid crystal display 112 of the blood pressure monitor 100. Thus, more diverse display manners can be provided in a case where the smartphone 14 presents the result of blood pressure measurement than in a case where the blood pressure monitor 100 presents the result of blood pressure measurement.

History Display Screen of Smartphone 14

FIG. 16 is a diagram illustrating an example of a history display screen of the smartphone 14. When the user touches the measurement history button 132 illustrated in FIG. 13, the smartphone 14 displays, on the touch panel 14a, for example, a historical display screen 160 illustrated in FIG. 16. The history display screen 160 includes a blood pressure transition graph 161 indicating a history of the result of blood pressure measurement, and buttons for invoking processing related to the history of the result of blood pressure measurement, the buttons including a medicine ingestion history confirmation button 162.

The blood pressure transition graph 161 is a graph in which the horizontal axis indicates the date and time of blood pressure measurement, and the vertical axis indicates the blood pressure value. Rectangles in the blood pressure transition graph 161 each indicate a blood pressure value at each date and time. The upper end of each rectangle indicates the maximum blood pressure, and the lower end of each rectangle indicates the lowest blood pressure. A maximum blood pressure transition 161a is a curve connecting the maximum blood pressures at the respective dates and times.

The medicine ingestion history confirmation button 162 is a button for invoking a screen indicating the history of medicine ingestion of the user of the smartphone 14. For example, the user stores the history of the medicine ingestion in the smartphone 14. Then, when the medicine ingestion history confirmation button 162 of the history display screen 160 is touched, a screen is displayed to display the history of the medicine ingestion stored in the smartphone 14, along with the history of the result of blood pressure measurement. Accordingly, the user can confirm the history of the result of blood pressure measurement in association with the history of the medicine ingestion.

Control Program

A control program stored in the auxiliary memory or the like of the smartphone 14 is stored in a non-transitory storage medium from which programs can be read by a computer. Such a "computer-readable storage medium" includes, for example, an optical medium such as a compact disc-ROM (CD-ROM), a USB memory stick, a magnetic storage medium such as a memory card, or the like. Additionally, such a program can also be provided by downloading via a network such as the Internet.

§ 4. Modifications

While embodiments of the present invention have been described in detail above, the foregoing description is merely illustrative of the present invention in all respects. Various modifications and variations can be made without departing from the scope of the present invention. For example, the following changes are possible. Note that, in the following, the same reference numerals are used for components that are the same as those of the above-described embodiment, and descriptions thereof are omitted as appropriate. The following modified examples can be combined as appropriate.

Modification 1

Modification of Installation Stand 111 of Blood Pressure Monitor 100

FIG. 17 is a diagram illustrating a modified example of the installation stand 111 of the blood pressure monitor 100. The bottom portion 111a of the installation stand 111 may be provided with sound-passing holes 171 to 173. The sound-passing holes 171 to 173 constitute an example of a shape that does not block at least one of the microphone and the speaker of the smartphone 14 installed on the installation stand 111.

For example, an end portion of the smartphone 14 that contacts the bottom portion 111a may be provided with the microphone, the speaker, or the like. The sound-passing holes 171 to 173 are provided in the bottom portion 111a to prevent the bottom portion 111a from blocking the microphone or the speaker of the smartphone 14 installed on the installation stand 111. In other words, the sound-passing holes 171 to 173 are provided to connect the microphone or the speaker of the smartphone 14 to outside air.

This allows the bottom portion 111a to be restrained from blocking the microphone of the smartphone 14 to attenuate sound traveling from the outside to the microphone 14, and also allows the bottom portion 111a to be restrained from blocking the speaker of the smartphone 14 to attenuate sound traveling from the speaker of the smartphone 14 to the outside.

The example illustrated in FIG. 17 is not the only shape that does not block at least one of the microphone and the speaker of the smartphone 14 installed on the installation stand 111, and any of various shapes can be used. For example, the bottom portion 111a of the installation stand 111 may be formed in a mesh shape.

Modification 2

The blood pressure monitor 100 may include a charging unit that charges a rechargeable battery for the smartphone 14 installed on the installation stand 111. Thus, when the smartphone 14 is installed on the installation stand 111 of the blood pressure monitor 100, blood pressure measurement can be achieved through cooperation between the blood pressure monitor 100 and the smartphone 14, and the smartphone 14 can also be charged. This allows improvement of convenience for the user.

The charging unit is of, for example, a non-contact charging type utilizing electromagnetic induction such as Qi (pronounced chee). In an alternative configuration, when the smartphone 14 is installed on the installation stand 111 of the blood pressure monitor 100, a communication electrode of the blood pressure monitor 100 may come into contact with a charging electrode of the smartphone 14. In this case, the charging unit may be of a contact charging type that supplies power to the smartphone 14 via these electrodes. A strong magnetic field is generated in the charging of these types (particularly the charging of the non-contact charging type).

Thus, in a case of performing blood pressure measurement, the blood pressure monitor 100 may perform control to stop the charging performed by the charging unit or to reduce the magnetism of the charging performed by the charging unit. The control for reducing the magnetism of the charging performed by the charging unit is, for example, control for weakening power transmitted in the charging. This allows the charging to be restrained from affecting the result of blood pressure measurement.

Modification 3

The smartphone 14 performs wireless communication in cooperation with the blood pressure monitor 100, in connection to a WLAN, and in connection to a cellular type base station. In these wireless communications, a strong magnetic field is generated.

Thus, in a case where the blood pressure monitor 100 performs blood pressure measurement, the smartphone 14 controls to stop at least a portion of the wireless communication performed by the smartphone 14 or to reduce the magnetism of the wireless communication performed by the smartphone 14. The control for reducing the magnetism of the wireless communication performed by the smartphone 14 means, for example, control for reducing the intensity of radio waves generated in the wireless communication performed by the smartphone 14. This allows the wireless communication to be restrained from affecting the result of blood pressure measurement.

As an example, during blood pressure measurement using the blood pressure monitor 100, the smartphone 14 stops at least one of the WLAN wireless communication and the cellular type wireless communication, while continuing the near-field wireless communication between the blood pressure monitor 100 and the smartphone 14. Thus, while the near-field wireless communication with a relatively low intensity of radio waves is used to enable transmission of the measurement in-progress information during the blood pressure measurement or transmission of the result of the blood pressure measurement performed by the blood pressure monitor 100, the WLAN wireless communication or the cellular type wireless communication with a relatively high intensity of radio waves is stopped and restrained from affecting the result of the blood pressure measurement.

Modification 4

In the configuration described above, wireless communication is used for the cooperation between the blood pressure monitor 100 and the smartphone 14. However, wired communication may be used for the cooperation between the blood pressure monitor 100 and the smartphone 14. For example, in a possible configuration, when the smartphone 14 is installed on the installation stand 111 of the blood pressure monitor 100, a communication electrode of the blood pressure monitor 100 may come into contact with a communication electrode of the smartphone 14 to enable wired communication between the blood pressure monitor 100 and the smartphone 14.

In this case also, the blood pressure monitor 100 and the smartphone 14 are integrated to enable wired communication between the blood pressure monitor 100 and the smartphone 14, allowing stable cooperation between the blood pressure monitor 100 and the smartphone 14.

Modification 5

The description involves the blood pressure as an example of the "biological information." However, the "biological Information" of the present invention is not limited to the blood pressure. For example, the "biological information" of the present invention may be another type of biological information such as the pulse rate described above. Additionally, the above description involves the blood pressure monitor 100 as an example of the "measurement device" of the present invention. However, the "measurement device" of the present invention is not limited to the blood pressure monitor 100. For example, the "measurement device" of the present invention may be a device for measuring another type of biological information such as the pulse rate described above.

Modification 6

The above description involves the smartphone 14 as an example of the "information terminal" of the present invention. However, the "information terminal" of the present invention is not limited to the smartphone 14. For example, the "information terminal" of the present invention may be any of various devices, such as a tablet terminal and a wearable device, which include a display unit that can display the result of measurement.

Modification 7

The above description involves the installation stand 111 as an example of the "installation unit" of the present invention. However, the "installation unit" of the present invention is not limited to the installation stand 111 illustrated in FIG. 1, FIG. 2, and the like. For example, by using, for the bottom portion 111a, a member such as rubber that has a great frictional force, the smartphone 14 may be prevented from slipping against the bottom portion 111a, thus omitting the anti-slip portion 111c. Alternatively, the "installation unit" of the present invention may detachably fix the information terminal to the measurement device using a magnet or a hook and loop fastener.

Modification 8

The above description involves the liquid crystal display 112 as an example of the "first display unit" of the present invention. However, the "first display unit" of the present invention is not limited to the liquid crystal display 112. For example, the "first display unit" of the present invention may be another display device such as an organic EL display or electronic paper. Additionally, the "first display unit" of the present invention may be a touch panel.

The above description involves the measurement start switch 113 as an example of the "operation unit" of the present invention. The "operation unit" of the present invention is not limited to the measurement start switch 113. For example, the "operation unit" of the present invention may be a capacitance switch, a voice input device, or the like.

Additionally, the measurement start switch 113 may also serve as an operation unit for instructing the stop of the measurement performed by the blood pressure monitor 100. For example, when the measurement start switch 113 is pressed during the blood pressure measurement performed by the blood pressure monitor 100, the blood pressure monitor 100 stops the blood pressure measurement. Thus, even in a case where the blood pressure measurement is prevented from being stopped due to a failure in the smartphone 14, or the like, the blood pressure measurement can be stopped by operating the measurement start switch 113. Additionally, the operation unit for instructing the stop of the measurement performed by the blood pressure monitor 100 may be provided separately from the measurement start switch 113.

Modification 9

The above description involves the touch panel 14a as an example of the "second display unit" of the present invention. However, the "second display unit" of the present invention is not limited to the touch panel 14a. For example, the "second display unit" of the present invention may be a display that does not support touch operations. Additionally, the "second display unit" of the present invention may be any of various display devices such as a liquid crystal display, an organic EL display, or electronic paper.

The above description involves turning off the first display unit as an example of "reducing the power consumption of the first display unit" in the present invention. However, "reducing the power consumption of the first display unit" in the present invention is not limited to turning off the first display unit. For example, "reducing the power consumption of the first display unit" in the present invention may be reducing luminance, providing intermittent display, reducing a refresh rate, or the like.

Modification 10

In the configuration described above, the smartphone 14 detects the smartphone 14 itself being installed on the installation stand 111 of the blood pressure monitor 100. However, in a possible configuration, the blood pressure monitor 100 may detect the smartphone 14 being installed on the installation stand 111 of the blood pressure monitor 100. For example, the blood pressure monitor 100 uses near-field communication, a proximity sensor, or the like to detect the smartphone 14 being installed on the installation stand 111 of the blood pressure monitor 100. Alternatively, a press switch may be provided on the bottom portion of the installation stand 111 or the like so that when the smartphone 14 is installed on the installation stand 111, the press switch is pressed to cause the blood pressure monitor 100 to detect the smartphone 14 being installed on the installation stand 111.

Modification 11

As an example of the configuration in which the result of blood pressure measurement is prevented from being visually recognized on the liquid crystal display 112 while the smartphone 14 is installed, the configuration has been described in which the liquid crystal display 112 is shielded by the smartphone 14 when the smartphone 14 is installed on the installation stand 111 of the blood pressure monitor 100. However, limitation to such a configuration is not intended.

For example, when detecting the smart phone 14 being installed on the installation stand 111 of the blood pressure monitor 100, the smartphone 14 may transmit the control signal to the blood pressure monitor 100 to control to cause the liquid crystal display 112 of the blood pressure monitor 100 to be turned off or to prevent the result of blood pressure measurement from being displayed. In this case, even in a configuration in which the liquid crystal display 112 is not shielded by the smartphone 14 even when the smartphone 14 is installed on the installation stand 111 of the blood pressure monitor 100, the result of blood pressure measurement is prevented from being visually recognized on the liquid crystal display 112 while the smartphone 14 is installed.

Modification 12

In the configuration described above, blood pressure measurement is started using the blood pressure monitor 100 in a case where the smartphone 14 is installed on the installation stand 111 of the blood pressure monitor 100 and where the smartphone 14 receives the measurement start operation. However, limitation to such a configuration is not intended. For example, when installed on the installation stand 111 of the blood pressure monitor 100, the smartphone 14 may control to start blood pressure measurement using the blood pressure monitor 100 even without receiving the measurement start operation. Thus, the user can start blood pressure measurement by installing the smartphone 14 on the installation stand 111 of the blood pressure monitor 100 with the cuff 121 attached to the user, for example.

In addition, when the smartphone 14 is removed from the installation stand 111 of the blood pressure monitor 100 during the blood pressure measurement performed by the blood pressure monitor 100, the blood pressure monitor 100 may stop the blood pressure measurement. Thus, for example, when the smartphone 14 receives an incoming call during blood pressure measurement and is removed from the installation stand 111, the blood pressure measurement can be stopped. For example, when detecting the blood pressure monitor 100 having been removed from the installation stand 111 during the blood pressure measurement performed by the blood pressure monitor 100, the smartphone 14 transmits the control signal to the blood pressure monitor 100 to control to stop the blood pressure measurement performed by the blood pressure monitor 100. Thus, the blood pressure measurement can be prevented from being continued and affected when the user is not at rest or the wireless communication is subjected to a high intensity of radio waves due to a call or the like.

Alternatively, when detecting an incoming call to the smartphone during the blood pressure measurement performed by the blood pressure monitor 100, the smartphone 14 may transmit the control signal to the blood pressure monitor 100 to perform control to stop the blood pressure measurement performed by the blood pressure monitor 100. Thus, the blood pressure measurement can be prevented from being continued and affected when the user is not at rest or the wireless communication is subjected to a high intensity of radio waves due to a call or the like.

While various embodiments have been described with reference to the drawings, needless to say, the present invention is not limited to such examples. It will be apparent to those skilled in the art that various changes and modifications can be made within the scope of the claims, and it is understood that these naturally belong within the technical scope of the present invention. Further, each of the components of the above-described embodiments may be combined as desired within a range that does not depart from the spirit of the present invention.

Note that the present application is based on Japanese Patent Application filed on Oct. 30, 2019 (JP 2019-197876), the contents of which are incorporated herein by reference.

REFERENCE NUMERALS LIST

10 Measurement system
14 Smartphone
14a Touch panel
30, 40 Computer
31, 41 Processor
32, 42 Memory
33, 43 Communication interface
34, 44 User interface
39, 49 Bus
51 Measurement unit
52 First display unit
53 Installation unit
54, 61 Communication unit
55, 63 Control unit
56 Operation unit
62 Second display unit
64 Detection unit
100 Blood pressure monitor
110 Body
111 Installation stand
111a Bottom portion
111b Set-against surface
111c Anti-slip portion
112 Liquid crystal display
113 Measurement start switch
121 Cuff
122 Air tube
130 Portal screen
131 Measurement button
132 Measurement history button
140 Measurement pre-start screen
141 Text Message
142 Measurement start button
150 Measurement result screen
160 History display screen
161 Blood pressure transition graph
161a Maximum blood pressure transition
162 Medicine ingestion history confirmation button
171 to 173 Sound-passing hole

The invention claimed is:

1. A measurement device comprising:
a measurement unit configured to perform measurement of biological information;
a first display unit configured to display a result of the measurement performed by the measurement unit;
an installation unit configured to install an information terminal on the installation unit, the information terminal including a second display unit configured to display the result of the measurement;
a communication unit configured to communicate with the information terminal; and
a control unit configured to cause the result of the measurement to be transmitted from the communication unit to the information terminal to cause the second display unit to display the result of the measurement, wherein
while the information terminal is installed on the installation unit, the result of the measurement is prevented from being visually recognized on the first display unit, and the first display unit is provided at a position where, while the information terminal is installed on the installation unit adjacent to and covering the first display unit, the first display unit is shielded from a user by the information terminal; wherein the installation unit includes a first surface configured to support a side portion of the information terminal placed on the first surface, and a second surface configured to support the information terminal placed against the second surface, the side portion of the information terminal being placed on the first surface, the second surface extending in a direction intersecting the first surface.

2. The measurement device according to claim 1, wherein the direction in which the second surface intersects the first surface is a longitudinal direction of the second surface, and the first display unit is provided at a position on the second surface that is closer to the first surface than a center of the second surface in the longitudinal direction.

3. The measurement device according to claim 1, wherein the installation unit is configured to install the information terminal on the installation unit in a first state in which the side portion of the information terminal extending in a lateral direction contacts the first surface and in a second state in which the side portion of the information terminal extending in the longitudinal direction contacts the first surface, and the first display unit is provided at a position on the second surface where the first display unit is shielded by the information terminal in both the first state and the second state.

4. The measurement device according to claim 1, wherein the control unit is configured to reduce power consumption of the first display unit when the information terminal is installed on the installation unit compared with when the information terminal is not installed on the installation unit.

5. The measurement device according to claim 1, further comprising: an operation unit configured to receive from the user a start instruction for the measurement while the information terminal is installed on the installation unit.

6. The measurement device according to claim 1, wherein the installation unit is configured not to block a microphone or a speaker of the information terminal when installed on the installation unit.

7. The measurement device according to claim 1, further comprising: a charging unit configured to charge a rechargeable battery for the information terminal when installed on the installation unit.

8. The measurement device according to claim 7, wherein the control unit is configured to stop the charging or reduce magnetism of the charging when the measurement unit performs the measurement.

9. A measurement system comprising:

a measurement device including a first display unit configured to display a result of measurement of biological information; and an information terminal configured to communicate with the measurement device and including a second display unit configured to display the result of the measurement, wherein the first display unit is provided at a position where, while the information terminal is installed on an installation unit, adjacent to and covering the first display unit, the first display unit is shielded from a user by the information terminal; wherein the installation unit includes a first surface configured to support a side portion of the information terminal placed on the first surface, and a second surface configured to support the information terminal placed against the second surface, the side portion of the information terminal being placed on the first surface, the second surface extending in a direction intersecting the first surface.

10. A measurement device comprising:

a measurement unit configured to perform measurement of biological information;

a first display unit configured to display a result of the measurement performed by the measurement unit;

the first display unit provided at a position where, while an information terminal is installed on an installation unit, the first display unit is shielded from the user by the information terminal;

the installation unit configured to install an information terminal on the installation unit, the information terminal including a second display unit configured to display the result of the measurement;

a communication unit configured to communicate with the information terminal; and a control unit configured to cause the result of the measurement to be transmitted from the communication unit to the information terminal to cause the second display unit to display the result of the measurement, wherein while the information terminal is installed on the installation unit, adjacent to and covering the first display unit, the result of the measurement is prevented from being visually recognized on the first display unit, and a portion of the installation unit that contacts an end portion of the information terminal when installed on the installation unit, is provided with a hole structure configured to prevent a microphone or a speaker provided at the end portion of the information terminal from being blocked; wherein the installation unit includes a first surface configured to support a side portion of the information terminal placed on the first surface, and a second surface configured to support the information terminal placed against the second surface, the side portion of the information terminal being placed on the first surface, the second surface extending in a direction intersecting the first surface.

11. A measurement system comprising:

a measurement device including a first display unit configured to display a result of measurement of biological information;

the first display unit provided at a position where, while an information terminal is installed on an installation unit, adjacent to and covering the first display unit, the first display unit is shielded from the user by the information terminal; and the information terminal configured to communicate with the measurement device, the information terminal including a second display unit configured to display the result of the measurement, wherein while the information terminal is installed on the installation unit, the result of the measurement is prevented from being visually recognized on the first display unit, and a portion of the installation unit that contacts an end portion of the information terminal when installed on the installation unit, is provided with a hole structure configured to prevent a microphone or a speaker provided at the end portion of the information terminal from being blocked; wherein the installation unit includes a first surface configured to support a side portion of the information terminal placed on the first surface, and a second surface configured to support the information terminal placed against the second surface, the side portion of the information terminal being placed on the first surface, the second surface extending in a direction intersecting the first surface.

12. A measurement device comprising:

a measurement unit configured to perform measurement of biological information;

a first display unit configured to display a result of the measurement performed by the measurement unit;

an installation unit configured to install an information terminal on the installation unit, the information terminal including a second display unit configured to display the result of the measurement;

a communication unit configured to communicate with the information terminal; and a control unit configured to cause the result of the measurement to be transmitted from the communication unit to the information terminal to cause the second display unit to display the result of the measurement, wherein while the information terminal is installed on the installation unit, the result of the measurement is prevented from being visually recognized on the first display unit, and the first display unit is provided at a position where, while the information terminal is installed on the installation unit, the first display unit is shielded from a user by the information terminal;

a first surface configured to support a side portion of the information terminal placed on the first surface;

a second surface configured to support the information terminal placed against the second surface, the side portion of the information terminal being placed on the first surface, the second surface extending in a direction intersecting the first surface;

wherein the installation unit is configured to install the information terminal on the installation unit in a first state in which the side portion of the information terminal extending in a lateral direction contacts the first surface and in a second state in which the side portion of the information terminal extending in the longitudinal direction contacts the first surface, and the first display unit is provided at a position on the second surface where the first display unit is shielded by the information terminal in both the first state and the second state.

* * * * *